US012597807B2

(12) United States Patent
Fujii

(10) Patent No.: US 12,597,807 B2
(45) Date of Patent: Apr. 7, 2026

(54) POWER FEEDING SYSTEM, POWER FEEDING APPARATUS, AND POWER FEEDING METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 19/100,715

(22) PCT Filed: Aug. 24, 2023

(86) PCT No.: PCT/JP2023/030601
§ 371 (c)(1),
(2) Date: Feb. 3, 2025

(87) PCT Pub. No.: WO2024/080005
PCT Pub. Date: Apr. 18, 2024

(65) Prior Publication Data
US 2026/0045830 A1 Feb. 12, 2026

(30) Foreign Application Priority Data
Oct. 11, 2022 (JP) ................................. 2022-163333

(51) Int. Cl.
*H02J 50/20* (2016.01)
*H01Q 1/24* (2006.01)
(Continued)

(52) U.S. Cl.
CPC .............. *H02J 50/20* (2016.02); *H01Q 1/248* (2013.01); *H01Q 21/00* (2013.01); *H02J 50/40* (2016.02); *H02J 50/80* (2016.02)

(58) Field of Classification Search
CPC ........... H02J 50/20; H02J 50/40; H02J 50/80; H01Q 1/248; H01Q 21/00
See application file for complete search history.

(56) References Cited

U.S. PATENT DOCUMENTS

| | | | | |
|---|---|---|---|---|
| 9,923,386 | B1 * | 3/2018 | Leabman | .............. H02J 50/402 |
| 12,224,599 | B2 * | 2/2025 | Jain | ......................... H02J 50/23 |

(Continued)

FOREIGN PATENT DOCUMENTS

| | | |
|---|---|---|
| JP | 2018-536372 | 12/2018 |
| JP | 2019-083648 | 5/2019 |

(Continued)

OTHER PUBLICATIONS

Leabman 2016109315 (Year: 2016).*

(Continued)

*Primary Examiner* — Daniel Cavallari
*Assistant Examiner* — Joshua James Sweet
(74) *Attorney, Agent, or Firm* — IPUSA, PLLC

(57) ABSTRACT

A power feeding system includes a power transmission control circuit configured to select one of a plurality of first antennas included in a plurality of antennas, and while transmitting a first power transmission signal having a fixed power transmission phase for a non-selected first antenna among the plurality of first antennas, to perform, while selecting the plurality of first antennas one by one, both a first power transmission process of transmitting a first power transmission signal having a predetermined phase from a selected first antenna, and a second power transmission process of transmitting a first power transmission signal having an inverted phase obtained by inverting the predetermined phase from the selected first antenna.

12 Claims, 22 Drawing Sheets

(51) Int. Cl.
    *H01Q 21/00*        (2006.01)
    *H02J 50/40*        (2016.01)
    *H02J 50/80*        (2016.01)

(56)          References Cited

U.S. PATENT DOCUMENTS

| | | | |
|---|---|---|---|
| 2017/0110909 A1 | 4/2017 | Zeine et al. | |
| 2018/0226839 A1* | 8/2018 | Higaki | H02J 50/402 |
| 2023/0327711 A1* | 10/2023 | Lee | H02J 50/12 |
| | | | 307/104 |
| 2024/0072577 A1 | 2/2024 | Fujii | |
| 2025/0038580 A1* | 1/2025 | Jung | H02J 50/90 |

FOREIGN PATENT DOCUMENTS

| | | | |
|---|---|---|---|
| JP | 2022-046025 | 3/2022 | |
| WO | WO-2016109315 A1 * | 7/2016 | H02J 50/20 |

OTHER PUBLICATIONS

Written Opinion of the International Searching Authority for PCT/JP2023/030601 mailed on Oct. 24, 2023.
International Search Report of PCT/JP2023/030601 mailed on Oct. 24, 2023.

* cited by examiner

FRAME

| TIME SLOT | | $k$ | $k+1$ | $k+2$ | $k+3$ | $k+4$ | $k+5$ | $\cdots$ | POWER FEEDING PERIOD |
|---|---|---|---|---|---|---|---|---|---|
| | | OPTIMIZATION PERIOD | | | | | | | |
| ANTENNA ELEMENTS IN ANTENNA SUBSET | $m_1$ | $\varphi_{m1}$ | | | $\varphi_{m1} + \pi$ | | | | RANDOM BEAMFORMING WHILE MAINTAINING RELATIONSHIP BETWEEN OPTIMIZED POWER TRANSMISSION PHASES |
| | $m_2$ | | $\varphi_{m2}$ | | | $\varphi_{m2} + \pi$ | | | |
| | $m_3$ | | | $\varphi_{m3}$ | | | $\varphi_{m3} + \pi$ | | |
| | $m_4$ | | | | $\varphi_{m4}$ | | | $\varphi_{m4} + \pi$ | |
| ANTENNA ELEMENTS NOT INCLUDED IN ANTENNA SUBSET | $n_1$ | FIXED PHASE | | | | | | | RANDOM BEAMFORMING |
| | $\cdots$ | FIXED PHASE | | | | | | | RANDOM BEAMFORMING |
| | $\cdots$ | FIXED PHASE | | | | | | | RANDOM BEAMFORMING |

FIG.6A
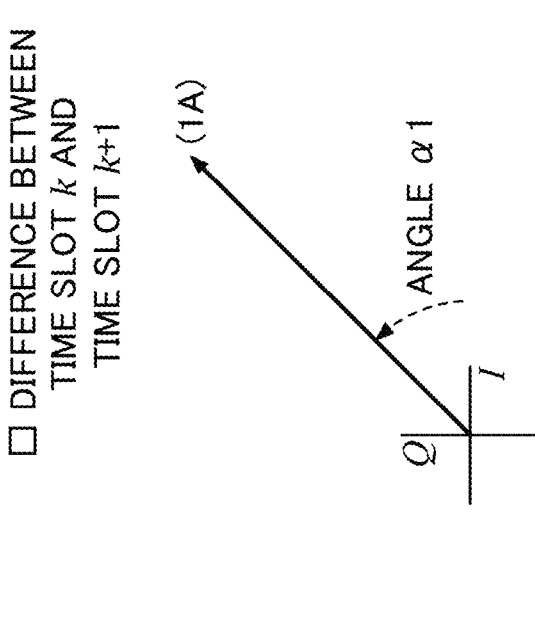
☐ DIFFERENCE BETWEEN TIME SLOT $k$ AND TIME SLOT $k+1$
ANGLE $\alpha 1$
(1A)
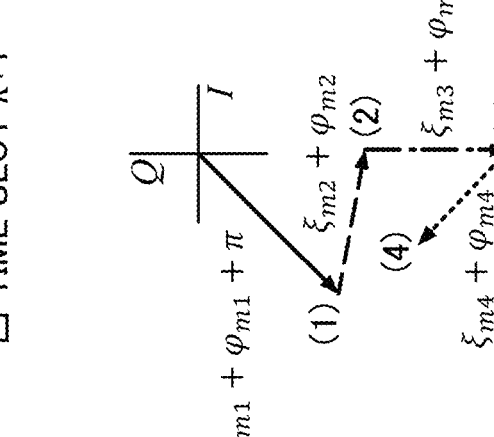
☐ TIME SLOT $k+1$
$\xi_{m1} + \varphi_{m1} + \pi$
$\xi_{m2} + \varphi_{m2}$
$\xi_{m3} + \varphi_{m3}$
$\xi_{m4} + \varphi_{m4}$
(1)
(2)
(3)
(4)
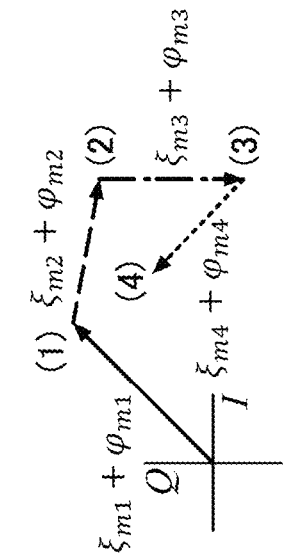
☐ TIME SLOT $k$
$\xi_{m1} + \varphi_{m1}$
$\xi_{m2} + \varphi_{m2}$
$\xi_{m3} + \varphi_{m3}$
$\xi_{m4} + \varphi_{m4}$
(1)
(2)
(3)
(4)

□ TIME SLOT $k+5$

FIG.8

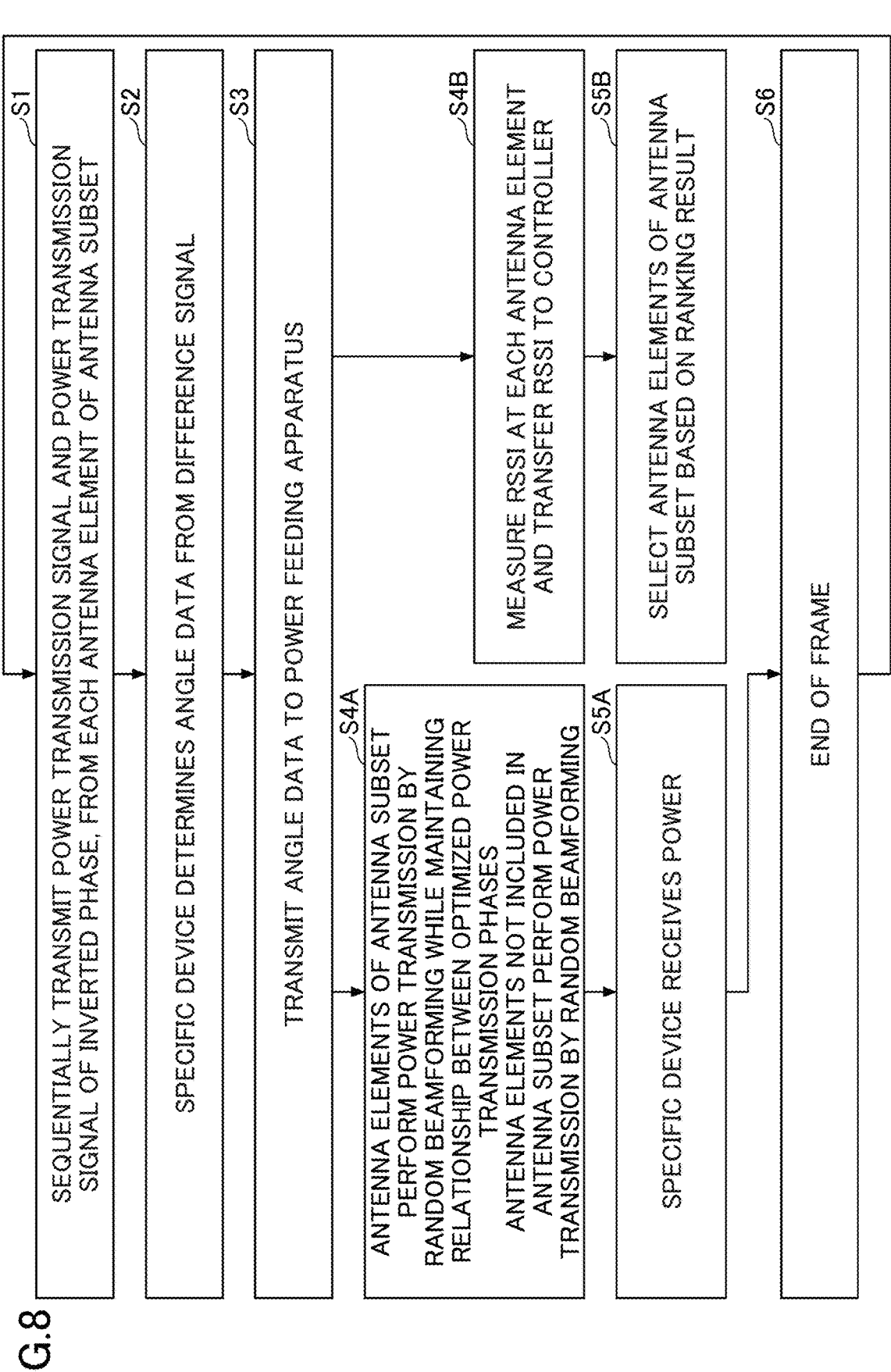

S1 — SEQUENTIALLY TRANSMIT POWER TRANSMISSION SIGNAL AND POWER TRANSMISSION SIGNAL OF INVERTED PHASE, FROM EACH ANTENNA ELEMENT OF ANTENNA SUBSET

S2 — SPECIFIC DEVICE DETERMINES ANGLE DATA FROM DIFFERENCE SIGNAL

S3 — TRANSMIT ANGLE DATA TO POWER FEEDING APPARATUS

S4A — ANTENNA ELEMENTS OF ANTENNA SUBSET PERFORM POWER TRANSMISSION BY RANDOM BEAMFORMING WHILE MAINTAINING RELATIONSHIP BETWEEN OPTIMIZED POWER TRANSMISSION PHASES ANTENNA ELEMENTS NOT INCLUDED IN ANTENNA SUBSET PERFORM POWER TRANSMISSION BY RANDOM BEAMFORMING

S4B — MEASURE RSSI AT EACH ANTENNA ELEMENT AND TRANSFER RSSI TO CONTROLLER

S5A — SPECIFIC DEVICE RECEIVES POWER

S5B — SELECT ANTENNA ELEMENTS OF ANTENNA SUBSET BASED ON RANKING RESULT

S6 — END OF FRAME

FIG.12

| | | Optimization period | | | | | | | | POWER FEEDING PERIOD |
|---|---|---|---|---|---|---|---|---|---|---|
| TIME SLOT | | $k$ | $k+1$ | $k+2$ | $k+3$ | $k+4$ | $k+5$ | $k+6$ | $k+7$ | ⋯ |
| ANTENNA ELEMENTS IN ANTENNA SUBSET | $m_1$ | $\varphi_{m1}$ | $\varphi_{m1}+\pi$ | OPTIMIZED POWER TRANSMISSION PHASE | | | | | | |
| | $m_2$ | $\varphi_{m2}$ | $\varphi_{m2}$ | $\varphi_{m2}$ | $\varphi_{m2}+\pi$ | OPTIMIZED POWER TRANSMISSION PHASE | | | | |
| | $m_3$ | $\varphi_{m3}$ | $\varphi_{m3}$ | $\varphi_{m3}$ | $\varphi_{m3}$ | $\varphi_{m3}$ | $\varphi_{m3}+\pi$ | OPTIMIZED POWER TRANSMISSION PHASE | | |
| | $m_4$ | $\varphi_{m4}$ | $\varphi_{m4}$ | $\varphi_{m4}$ | $\varphi_{m4}$ | $\varphi_{m4}$ | $\varphi_{m4}$ | $\varphi_{m4}$ | $\varphi_{m4}+\pi$ | OPTIMIZED POWER TRANSMISSION PHASE |
| ANTENNA ELEMENTS NOT INCLUDED IN ANTENNA SUBSET | $n_1$ | FIXED PHASE | FIXED PHASE | FIXED PHASE | FIXED PHASE | FIXED PHASE | FIXED PHASE | FIXED PHASE | FIXED PHASE | FIXED PHASE |
| | ⋮ | FIXED PHASE | FIXED PHASE | FIXED PHASE | FIXED PHASE | FIXED PHASE | FIXED PHASE | FIXED PHASE | FIXED PHASE | FIXED PHASE |
| | ⋮ | FIXED PHASE | FIXED PHASE | FIXED PHASE | FIXED PHASE | FIXED PHASE | FIXED PHASE | FIXED PHASE | FIXED PHASE | FIXED PHASE |

FIG.13B
☐ TIME SLOT k+2
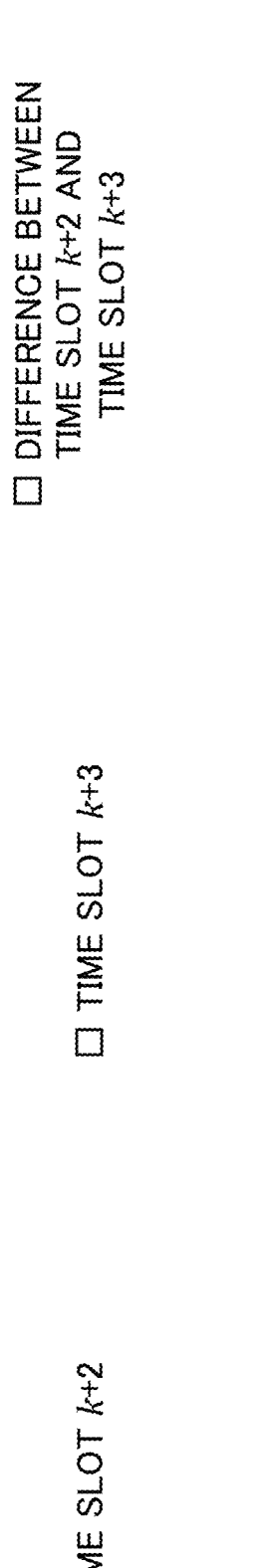
☐ TIME SLOT k+3
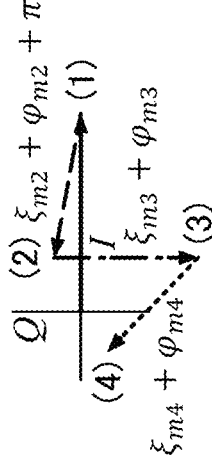
☐ DIFFERENCE BETWEEN TIME SLOT k+2 AND TIME SLOT k+3

□ TIME SLOT $k+8$

POWER FEEDING SYSTEM, POWER FEEDING APPARATUS, AND POWER FEEDING METHOD

TECHNICAL FIELD

The present invention relates to a power feeding system, a power feeding apparatus, and a power feeding method.

BACKGROUND

Conventionally, there exists a power feeding device having first detecting means for detecting a direction of a power receiving device; and control means for controlling a radiation unit that radiates feeding power such that the radiation unit performs a first radiation, which radiates the feeding power wirelessly in a direction of the power receiving device detected by the first detecting means, and such that the radiation unit performs a second radiation, which radiates the feeding power wirelessly while changing a direction of radiating the feeding power within a predetermined range (see, for example, Patent Document 1).

RELATED-ART DOCUMENTS

Patent Documents

Patent Document 1: Japanese Unexamined Patent Application Publication No. 2019-083648

SUMMARY

Problem to be Solved by the Invention

Although the conventional power feeding device radiates the feeding power to the power receiving device by performing the first radiation and the second radiation, it does not disclose promptly setting phases capable of increasing received power at the power receiving device.

Therefore, an object is to provide a power feeding system, a power feeding apparatus, and a power feeding method capable of promptly setting phases for increasing received power at a power receiving device.

Means for Solving the Problem

A power feeding system according to an embodiment of the present invention includes a power feeding apparatus, and a power receiving device configured to receive power transmission signals transmitted from the power feeding apparatus. The power feeding apparatus includes an array antenna including a plurality of antennas configured to transmit power, and a power transmission control unit configured to control phases of the power transmission signals that are to be transmitted from the plurality of antennas to the power receiving device, and control power transmission. The power transmission control unit is configured to: select one of a plurality of first antennas included in the plurality of antennas; and while transmitting a first power transmission signal having a fixed power transmission phase for a non-selected first antenna among the plurality of first antennas, perform, while selecting the plurality of first antennas one by one, both a first power transmission process of transmitting a first power transmission signal having a predetermined phase from the selected first antenna, and a second power transmission process of transmitting a first power transmission signal having an inverted phase obtained by inverting the predetermined phase from the selected first antenna. The power receiving device is configured to: determine a difference signal between a first combined signal, which combines the first power transmission signal having the predetermined phase and the first power transmission signal having the fixed power transmission phase, the first power transmission signals being both received from the plurality of first antennas in the first power transmission process; and a second combined signal, which combines the first power transmission signal having the inverted phase and the first power transmission signal having the fixed power transmission phase, the first power transmission signals being both received from the plurality of first antennas in the second power transmission process; and transmit the difference signal to the power transmission control unit. The power transmission control unit is configured to control phases of the plurality of first power transmission signals transmitted by the plurality of first antennas, based on a plurality of difference signals obtained by selecting each of the plurality of first antennas.

Effects of the Invention

A power feeding system, a power feeding apparatus, and a power feeding method capable of promptly setting phases for increasing received power at a power receiving device can be provided.

BRIEF DESCRIPTION OF THE DRAWINGS

FIG. 1 is a diagram showing a power feeding apparatus 100 according to an embodiment.

FIG. 4 is a diagram showing an example of a frame structure.

FIG. 5 is a diagram showing an example of an optimization process.

FIG. 6A is a diagram showing power reception phases of power transmission signals received by a specific device 50A.

FIG. 8 is a flowchart showing an example of a process performed by the controller 140 of a power feeding system 300 and the specific device 50A.

FIG. 12 is a diagram for describing an example of the optimization process in the power feeding system 300 in a modification of the embodiment.

FIG. 13B is a diagram for describing the power reception phases of the power transmission signals received by the specific device 50A in the modification of the embodiment.

MODE FOR CARRYING OUT THE INVENTION

Figure 2:
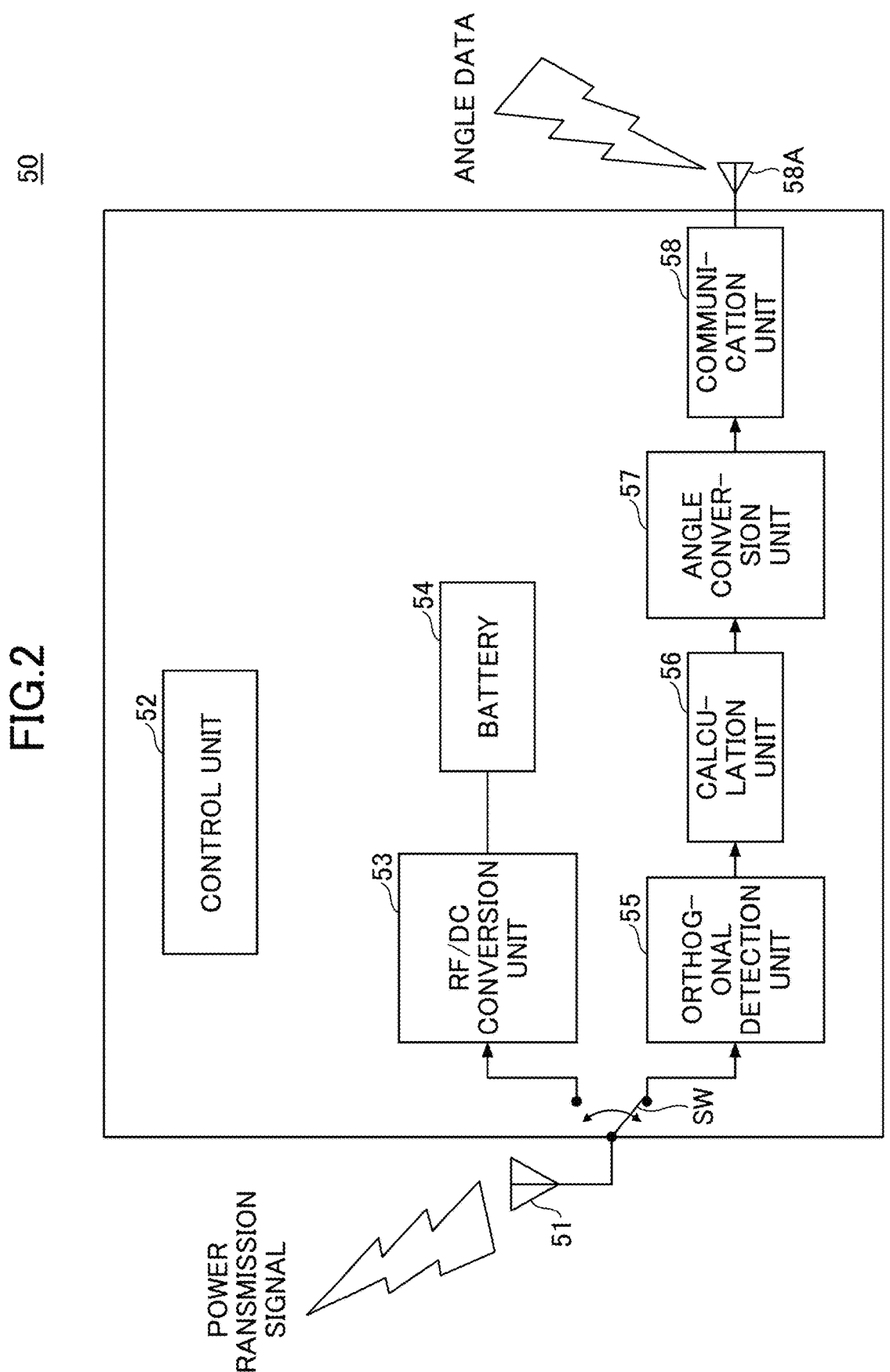
FIG. 2 is a diagram showing a configuration example of a specific device 50A.

Hereinafter, one or more embodiments to which a power feeding system, a power feeding apparatus, and a power feeding method of the present invention are applied will be described.

EMBODIMENTS

Power Feeding System 300

Figure 1:
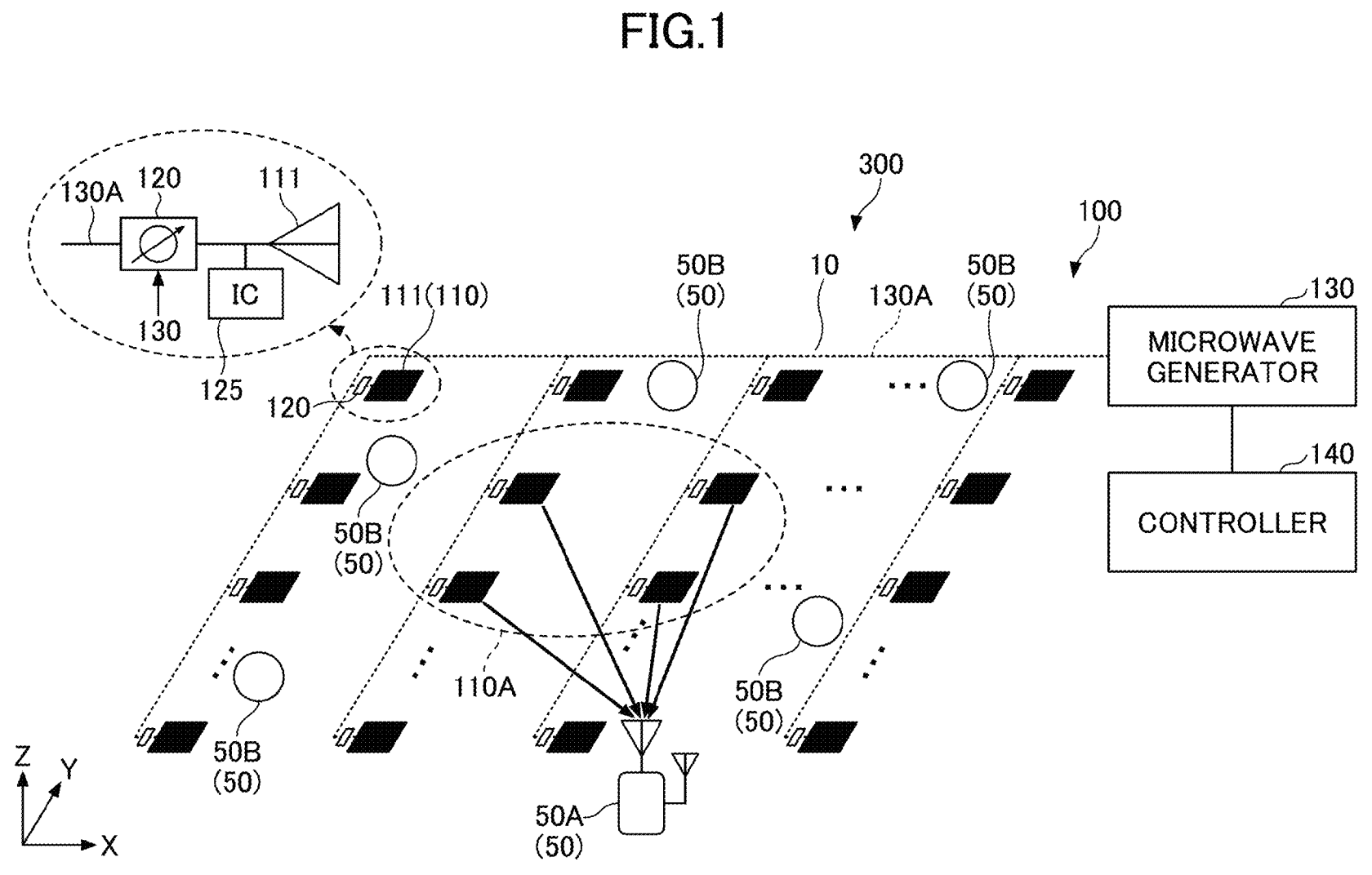

FIG. 1 is a diagram showing a power feeding system 300 according to the embodiment. The power feeding system 300 includes a power feeding apparatus 100 and a specific device 50A. The specific device 50A is an example of a power receiving device. In the following, description will be provided using an XYZ coordinate system. A plane view is an XY plane view. The power feeding system 300 may also include the power feeding apparatus 100 and a plurality of devices 50. The plurality of devices 50 include the specific device 50A and a plurality of non-specific devices 50B other than the specific device 50A.

In an example, the power feeding apparatus 100 is arranged in a region 10 of a large-scale facility such as a smart factory, a large-scale plant, a distribution center, or a warehouse. The power feeding apparatus 100 includes an array antenna 110, phase shifters 120, IC chips 125, a microwave generator 130, and a controller 140. The power feeding apparatus 100 feeds power to the plurality of devices 50 that are present in the region 10 in a non-contact manner (microwave power feeding). The power feeding method according to the embodiment is a power feeding method that is implemented by the power feeding apparatus 100. In particular, the power feeding method is implemented by a process executed by the controller 140.

In the power feeding apparatus 100, the array antenna 110 transmits power by beamforming, when the power is fed to an unspecified number of devices 50. A plurality of antenna elements 111 of the array antenna 110 can transmit the power in power transmission phases that are specified by a power transmission control unit described later. When phases of power transmission signals output by the plurality of antenna elements 111 are fixed, standing waves are generated in the region 10 due to one or more beams that are formed by the signals output from the plurality of antennas, and almost no power is fed to one or more devices 50 located at nodes of the standing waves. In order to avoid such a situation, the power feeding apparatus 100 randomly shifts the phases of the power transmission signals output from the plurality of antenna elements 111 over time, so that the nodes of the standing waves do not occur in a specific place for a long time. In other words, the nodes of the standing waves move within the region 10. The phases of the power transmission signals are shifted according to time slots. The power transmission signals are signals transmitted (radiated) from the antenna elements 111, and are RF (Radio Frequency) signals having predetermined power. As an example, a frequency of the power transmission signal is 918 MHz.

In this arrangement, power transmission that is performed using the beam, which is formed by randomly shifting the phases of the plurality power transmission signals output from the plurality of antenna elements 111 according to the time slots, is hereinafter referred to as random beamforming.

Also, among the plurality of devices 50, there may be a device 50 that needs more received power to charge an internal battery 54. For example, such a device is a device 50 that consumes more power than other devices 50, and in which the internal battery 54 has less remaining power. Such a device 50 that requires more power is referred to as the specific device 50A. In FIG. 1, one device 50 at a certain time point is shown as the specific device 50A.

The specific device 50A receives power mainly from multiple antenna elements 111 included in an antenna subset 110A, among the plurality of antenna elements 111. This is to charge the battery 54 of the specific device 50A earlier by performing more concentrated power transmission than random beamforming.

The multiple antenna elements 111 included in the antenna subset 110A are examples of first antennas. Antenna elements 111 not included in the antenna subset 110A are examples of second antennas. Also, power transmission signals transmitted from the antenna elements 111 included in the antenna subset 110A are examples of first power transmission signals, and power transmission signals transmitted from the antenna elements 111 not included in the antenna subset 110A are examples of second power transmission signals.

Phases for power transmission from the multiple antenna elements 111 included in the antenna subset 110A to the specific device 50A are set for each frame. In FIG. 1, the antenna subset 110A includes four antenna elements 111. The antenna subset 110A, and phase shifting of the power transmission signals to the specific device 50A will be described later.

Among the plurality of devices 50, devices other than the specific device 50A are referred to as non-specific devices 50B. All devices 50 can be specific devices 50A depending on a situation. For the specific device 50A, when the battery 54 is charged sufficiently, concentrated power feeding to the specific device 50A from the antenna subset 110A stops, and the specific device 50A becomes a non-specific device 50B. The non-specific device 50B receives power transmission by random beamforming from the antenna elements 111 including the antenna subset 110A.

Also, the specific device 50A may be mobile in a manner such that the specific device 50A is mounted on a remotely manageable mobile device such as an automatic guided vehicle (AGV) or an autonomous mobile robot (AMR). The specific device 50A may have a configuration in which all devices 50 are mounted on such a mobile device and can become specific devices 50A depending on a situation, or may have a configuration in which only a portion of all devices 50 is mounted on the above mobile device and can become specific devices 50A depending on a situation. As an example, a manner in which the specific device 50A is mounted on a mobile device and is movable will be described below.

The power feeding apparatus 100 is a power feeding apparatus capable of performing both power transmission by random beamforming to non-specific device(s) 50B and power transmission from the antenna subset 110A to the specific device 50A. In the following, when the specific device 50A and the non-specific devices 50B are not specifically distinguished, these devices will simply be referred to as devices 50.

Configuration of Specific Device 50A

FIG. 2 is a diagram showing a configuration example of the specific device 50A. The specific device 50A includes an antenna 51, a switch SW, a control unit 52, an RF/DC (Direct Current) conversion unit 53, a battery 54, an orthogonal detection unit 55, a calculation unit 56, an angle conversion unit 57, and a communication unit 58. The communication unit 58 includes an antenna 58A.

The antenna 51 is an antenna for receiving power from one or more antenna elements 111. The antenna 51 outputs the received power to the switch SW. The switch SW is switched by the control unit 52 to switch a connection destination of the antenna 51 to either the RF/DC conversion unit 53 or the orthogonal detection unit 55.

The control unit 52 switches the switch SW between an optimization period and a power feeding period in each frame. The control unit 52 switches the switch SW to connect to the orthogonal detection unit 55 for the optimization period, and switches the switch SW to connect to the RF/DC conversion unit 53 for the power feeding period.

During the optimization period, the control unit 52 causes the orthogonal detection unit 55, the calculation unit 56, the angle conversion unit 57, and the communication unit 58 to perform a process to transmit data representing an angle that is obtained from a difference signal to the controller 140 of the power feeding apparatus 100.

The control unit 52 performs a charging control to charge the battery 54 with received power that is received from one or more antenna elements 111 via the antenna 51 during the power feeding period.

The battery 54 is, for example, a secondary battery or a capacitor, and charges power fed from the antenna 51. The power charged to the battery 54 is used when the switch SW, the control unit 52, the RF/DC conversion unit 53, the orthogonal detection unit 55, the calculation unit 56, the angle conversion unit 57, and the communication unit 58 operate.

A load that consumes power may be connected to the battery 54. For example, the load may be a sensor that detects temperature, humidity, or the like. In this case, the device 50 can be used as a sensor device. The load may be a power source such as a motor or an actuator, or the device 50 may be a device that performs dynamic operations.

When the device 50 is attached to a movable device, the power charged by the battery 54 can be used as power for driving a power source such as a motor of the movable device; or a control unit or the like.

The RF/DC conversion unit 53 is a converter (conversion circuit) that converts the power transmission signal (RF signal) that is received power (received) by the antenna 51 into DC power, and that outputs the DC power to the battery 54.

The orthogonal detection unit 55 demodulates the power transmission signal received by the antenna 51, extracts phase information, and outputs the phase information to the calculation unit 56. The phase information extracted by the orthogonal detection unit 55 represents a phase of the power transmission signal received by the antenna 51.

The calculation unit 56 performs subtraction processing to determine a difference signal based on the phase represented by the phase information extracted by the orthogonal detection unit 55. The subtraction processing will be described later.

The angle conversion unit 57 converts the difference signal calculated by the calculation unit 56 into an angle in IQ coordinates, and outputs angle data representing the angle to the communication unit 58.

The communication unit 58 transmits the angle data output from the angle conversion unit 57, to the power feeding apparatus 100 via an antenna 58A.

Although the configuration of the specific device 50A, among the plurality of devices 50, has been described with reference to FIG. 2, any device 50 that does not become the specific device 50A and functions only as the non-specific device 50B, does not need to have the switch SW, the orthogonal detection unit 55, the calculation unit 56, the angle conversion unit 57, and the communication unit 58. In this case, the control unit 52 only needs to control the charging of the battery 54.

Array Antenna 110

The array antenna 110 is an example of a two-dimensional antenna grid, and includes, as an example, antenna elements 111 arranged in a matrix. As an example, 256 antenna elements 111 include 16 elements in an X direction and 16 elements in a Y direction. The 256 antenna elements 111 are positioned on the XY plane.

Each antenna element 111 is connected to the microwave generator 130 via one or more power transmission cables 130A, and power in a microwave band is fed. Four antenna elements 111, which are selected as antenna elements 111 constituting the antenna subset 110A among the 256 antenna elements 111 by being controlled by the controller 140, transmit power in optimized phases toward the specific device 50A, but power is also secondarily fed to one or more non-specific devices 50B that are located in the vicinity of the specific device 50A. Antenna elements 111 not included in the antenna subset 110A transmit power to one or more non-specific devices 50B by random beamforming, but power is also secondarily fed to the non-specific devices 50B from any antenna element(s) that are located relatively near the specific device 50A. The number of antenna elements 111 included in the antenna subset 110A may be any number as long as there are multiple elements. Each antenna element 111 is a rectangular patch antenna in plan view. Each antenna element 111 may have a ground plate held at a ground potential on a-Z direction side.

Further, in accordance with the movement of the specific device 50A, the antenna elements 111 constituting the antenna subset 110A are reviewed for each frame, and any antenna elements 111 to be included in the antenna subset 110A are selected.

Each antenna element 111 is attached to a ceiling, a pillar, or the like of a large-scale facility such as the smart factory described above. A distance between antenna elements 111 corresponds to, for example, multiple wavelengths of the communication frequency of the antenna element 111. The communication frequency of the antenna element 111 is assumed to be a microwave band as an example, and is 918 MHz as an example.

FIG. 1 shows, as an example, a state in which the specific device 50A receives the power from the four antenna elements 111 among the 256 antenna elements 111 included in the array antenna 110 as described above. In this state, a set of antenna elements 111 selected by the controller 140 to transmit the power to the specific device 50A is referred to as the antenna subset 110A. Antenna elements 111 not included in the antenna subset 110A transmit power by random beamforming while shifting phases of power transmission signals according to time slots, and the power transmitted by the random beamforming is received by non-specific devices 50B, but is also received secondarily by the specific device 50A.

The phase shifters 120 are connected to respective antenna elements 111 in a 1-to-1 relationship, and each of phase inserted a the shifters is between corresponding antenna element 111 and the transmission cable 130A. In FIG. 1, for convenience of explanation, one antenna element 111, the phase shifter 120, and the IC chip 125 are enlarged.

The phase shifter 120 shifts a power transmission phase of the power transmitted from the microwave generator 130 via the power transmission cable 130A, and outputs the resulting power to the antenna element 111. The phase shifter 120 is an example of a phase adjusting unit. The IC chip 125 includes a measurement unit that measures RSSI (Received Signal Strength Indicator) of the received power, and includes a BLE communication unit. The IC chip 125 transmits a beacon signal including data representing a measured RSSI value to the controller 140. The communication unit of the IC chip 125 has an antenna for BLE communication.

The microwave generator 130 is connected to 256 phase shifters 120 and supplies microwaves at a predetermined power level. The microwave generator 130 is an example of a radio wave generator. The frequency of the microwave is 918 MHz as an example. Although a case where the power feeding apparatus 100 includes the microwave generator 130 is described, it is not limited to microwaves, and any radio waves of a predetermined frequency may be used.

The controller 140 is an example of a control unit, and is a microcomputer having a CPU (Central Processing Unit), a ROM (Read Only Memory), a RAM (Random Access Memory), and a non-volatile memory, and the like. As an example, discrete wavelet multitone (DWMT) can be used.

The controller 140 has an antenna 140A and receives a beacon signal in which angle data is written from the specific device 50A.

The controller 140 performs a selection control (ranking processing) of antenna elements 111 included in the antenna subset 110A, a phase control of the 256 phase shifters 120, and a power output control of the microwave generator 130. The phase control of power transmission signals of the antenna elements 111 included in the antenna subset 110A, and the phase control of power transmission signals by random beamforming of antenna elements 111 not included in the antenna subset 110A are implemented by the phase control of the phase shifters 120.

Controller 140

Figure 3:
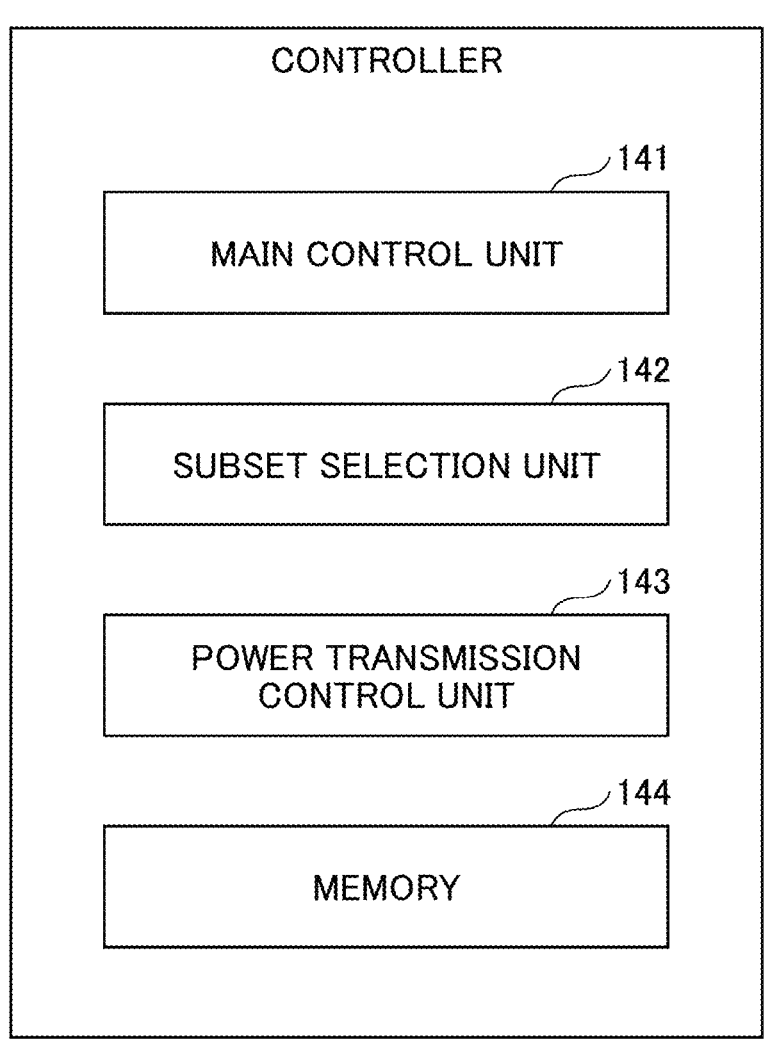
FIG. 3 is a diagram showing a configuration of a controller 140.

FIG. 3 is a diagram showing the configuration of the controller 140. The controller 140 includes a main control unit 141, a subset selection unit 142, a power transmission control unit 143, and a memory 144. The main control unit 141, the subset selection unit 142, and the power transmission control unit 143 represent functions of one or more programs that are executed by the controller 140, as functional blocks. The memory 144 functionally represents a memory in the controller 140.

The main control unit 141 is a processing unit that supervises processing of the controller 140, and executes processing other than that executed by the subset selection unit 142 and the power transmission control unit 143.

The subset selection unit 142 is an example of an antenna selection unit. When a difference signal is transmitted from the specific device 50A in each frame, and RSSI values are acquired in a case where difference signals are received by all antenna elements 111, the subset selection unit 142 selects multiple antenna elements 111 included in the antenna subset 110A based on RSSI value ranking. Details of such a selection method based on the RSSI value ranking will be described later with reference to FIG. 7.

The power transmission control unit 143 performs a power transmission control to transmit power from all the antenna elements 111. When power transmission is performed from all the antenna elements 111, the power transmission control unit 143 performs the power transmission control by random beamforming in which phases of the power transmission signals from all the antenna elements 111 are randomly set and the phases are randomly shifted for each time slot (random mode). In this arrangement, one or more positions of standing waves of any power transmission signals in the region 10 (see FIG. 1) can be prevented from being temporally fixed, and thus all devices 50 can receive power relatively uniformly.

When the antenna subset 110A is constructed using the subset selection unit 142, the power transmission control unit 143 performs an optimization process during an optimization period in each frame, and performs a power feeding process during a power feeding period in each frame. The optimization process during the optimization period, and the power feeding process during the power feeding period will be described later.

The memory 144 stores data, programs, and the like used when the main control unit 141, the subset selection unit 142, and the power transmission control unit 143 perform processing. Data representing a given phase of the power transmission signal in each time slot is also stored in the memory 144.

Frame Structure

Figure 4:
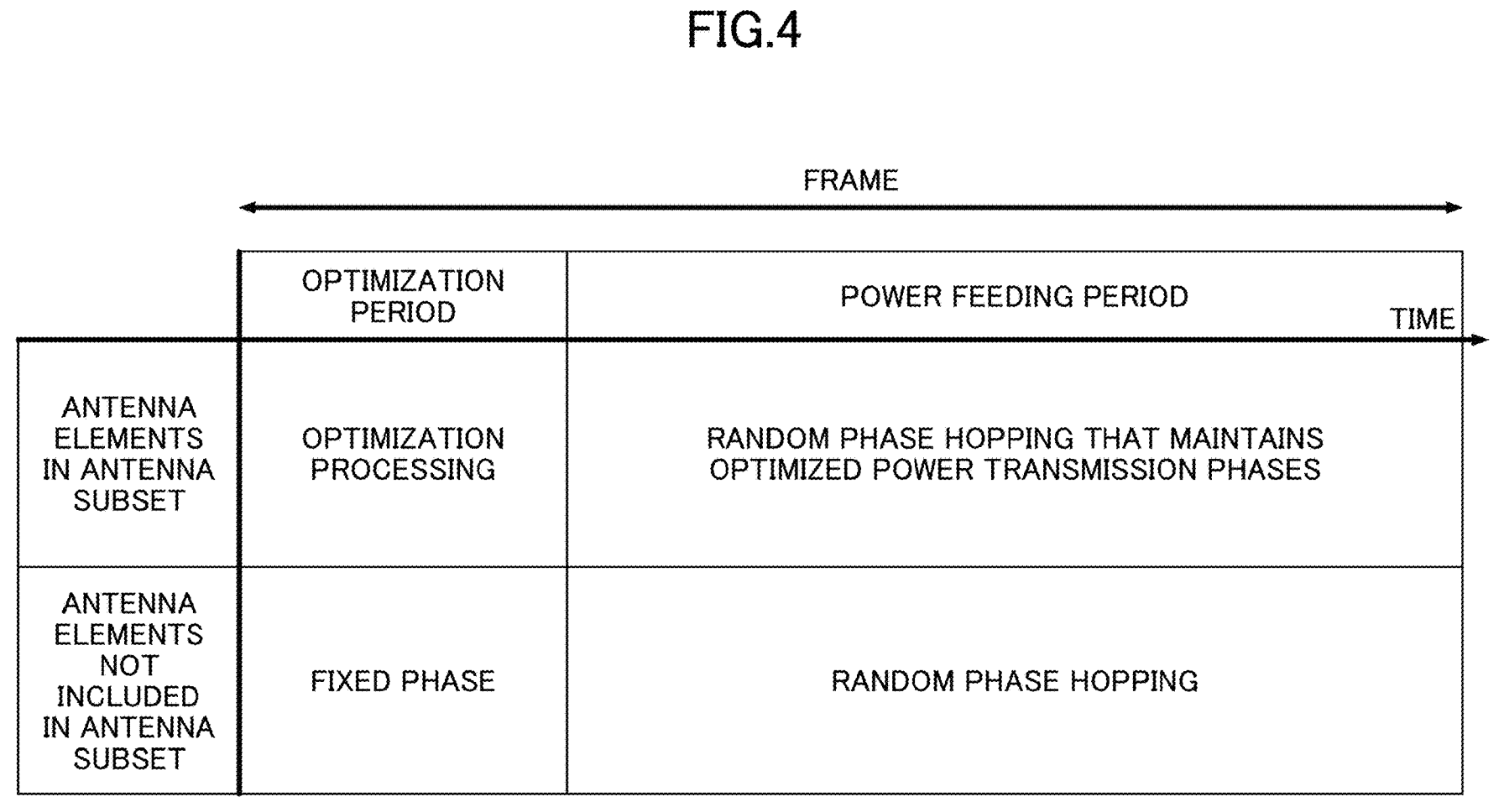

FIG. 4 shows an example of a frame structure. As an example, a frame period is 50 ms. The frame includes the optimization period and the power feeding period. The power feeding period is set after the optimization period.

The optimization period is a period during which the optimization process is performed to optimize phases (power transmission phases) of power transmission signals transmitted by multiple antenna elements 111 included in the antenna subset 110A. The optimizing of the phases of the power transmission signals transmitted by the multiple antenna elements 111 means to align phases (power reception phases) in which the power transmission signals transmitted by the multiple antenna elements 111 are received by the antenna 51 of the specific device 50A. If the power reception phases of the multiple power transmission signals are aligned, the received power of the specific device 50A can be maximized. The above phase alignment is not limited to a case where phases are completely identical, but also includes a case where the phases are substantially equivalent to being completely identical. This is because in some cases, it is not easy to align the phases strictly, and for example, if phase deviation is within about ±5%, it is considered sufficiently aligned.

In the optimization period, phases of power transmission signals transmitted by multiple antenna elements 111 not included in the antenna subset 110A are each set at a fixed value. When the power transmission phases of the antenna elements 111 included in the antenna subset 110A are optimized, power transmission phases of the multiple antenna elements 111 not included in the antenna subset 110A are fixed so as to prevent the influence of the power transmission signals transmitted from the multiple antenna elements 111 not included in the antenna subset 110A.

The power feeding period is a period in which the power feeding process of transmitting power transmission signals from multiple antenna elements 111 is performed in a state where phases of the power transmission signals transmitted by the multiple antenna elements 111 are optimized by the optimization process in the optimization period. During the power feeding period, m beamforming is performed for the multiple antenna elements 111 included in the antenna subset 110A in a state of maintaining the relationship between a plurality of power transmission phases that are determined by the optimization process in an optimization section within the same frame. Also, for multiple antenna elements 111 not included in the antenna subset 110A, random beamforming is performed without setting any relationship between power transmission phases of the multiple antenna elements 111.

Optimization of Power Transmission Phases

The four antenna elements 111 included in the antenna subset 110A are distinguished as antenna elements $m_1$ to $m_4$, and the optimization of the power transmission phase for an antenna element $m_1$ will be described.

During optimization, power transmission is performed together with antenna elements $m_2$ to $m_4$ in either a currently set phase for the antenna element $m_1$ or in a specific phase (for example, 0 degrees). A signal received by the specific device 50A is a signal obtained by combining power transmission signals from all antenna elements 111 at the antenna 51 of the specific device 50A. When describing by extracting the contribution from the antenna element $m_1$ in time slot k, a power transmission signal r(k), which is converted to a baseband signal (demodulated by the orthogonal detection unit 55) by a regenerated carrier through signal conversion from a radio frequency into baseband (orthogonal detection), is expressed by the following equation (1).

[Math. 1]

$$r(k) = \sqrt{P_{R,m_1}} \exp\{j(\xi_{m_1} + \varphi_{m_1}(k))\} + \qquad (1)$$
$$\sum_{m \in S\backslash m_1} \sqrt{P_{R,m}} \exp\{j(\xi_m + \varphi_m(k))\} + \sum_{n \in A\backslash S} \sqrt{P_{R,n}} \exp\{j(\xi_n + \varphi_n(k))\}$$

Here, A is the entire antenna set, S is the antenna subset, $\varphi_{m1}$ (k) in the first term is the power transmission phase set in the antenna element $m_1$, $PR_{m1}$ is received power, and $\xi_{m1}$ is phase displacement between the antenna element $m_1$ and the antenna 51, and is a remainder (fractional part) when a distance between the antenna element $m_1$ and the antenna 51 is divided by the wavelength. The second term relates to a signal component received from antenna elements $m_2$ to $m_4$ other than the antenna element $m_1$ in the antenna subset 110A. The third term relates to a signal component received from antenna elements 111 not included in the antenna subset 110A. During the optimization process, a temporal variation in the phase between antenna elements 111 and the antenna 51 is assumed to be negligibly small.

In subsequent time slot k+1, power transmission is performed with a power transmission phase from the antenna element $m_1$ that is shifted by 180 degrees ($\pi$), that is, with the phase inverted, together with other antenna elements $m_2$ to $m_4$ included in the antenna subset 110A and antenna elements 111 not included in the antenna subset 110A. A power transmission phase $\varphi_{m1}$ (k+1) for the antenna element $m_1$ in the time slot k+1 is expressed by the following equation (2).

[Math. 2]

$$\varphi_{m_1}(k+1) = \varphi_{m_1}(k) + 180 \qquad (2)$$

Here, when the power transmission phase $\varphi_{m1}$ (k+1) exceeds 360 degrees, it is reduced to a range of 1 to 360 degrees by modulo operation. Since power transmission phases for the other antenna elements $m_2$ to $m_4$ included in the antenna subset 110A and the antenna elements 111 not included in the antenna subset 110A are not changed, only the power transmission phase for the antenna element m; changes (inverts).

The specific device 50A on a receiving side similarly converts a signal from the radio frequency to the baseband signal (orthogonal detection). A power transmission signal r(k+1) received in the time slot k+1 is a signal obtained by combining, at the antenna 51, the power transmission signals transmitted from all antenna elements 111, as in the time slot k. When describing by extracting the contribution from the antenna element $m_1$, the power transmission signal r(k+1) is expressed by the following equation (3).

[Math. 3]

$$r(k+1) = \sqrt{P_{R,m_1}} \exp\{j(\xi_{m_1} + \varphi_{m_1}(k+1))\} + \qquad (3)$$
$$\sum_{m \in S\backslash m_1} \sqrt{P_{R,m}} \exp\{j(\xi_m + \varphi_m(k+1))\} + \sum_{n \in A\backslash S} \sqrt{P_{R,n}} \exp\{j(\xi_n + \varphi_n(k+1))\}$$

The power transmission signal received in the time slot k+1 is subtracted from the power transmission signal received in the time slot k. Since the antenna elements 111 other than the antenna element $m_1$ transmit power in the same power transmission phase over two consecutive time slots k and k+1, the resulting power units are canceled, and the difference signal is expressed by the following equation (4), and only a signal component from the antenna element $m_1$ remains.

[Math. 4]

$$q(k+1) = r(k) - r(k+1) = \qquad (4)$$
$$\sqrt{P_{R,m_1}} \left[ \exp\{j(\xi_{m_1} + \varphi_{m_1}(k))\} - \exp\{j(\xi_{m_1} + \varphi_{m_1}(k+1))\} \right] =$$
$$\sqrt{P_{R,m_1}} \left[ \exp\{j(\xi_{m_1} + \varphi_{m_1}(k))\} - \exp\{j(\xi_{m_1} + \varphi_{m_1}(k) + \pi)\} \right] =$$
$$2\sqrt{P_{R,m_1}} \exp\{j(\xi_{m_1} + \varphi_{m_1}(k))\}$$

A power transmission phase ($\xi m_1 + \varphi m_1$ (k)) of the power transmission signal transmitted from the antenna element $m_1$ is detected as shown in the following equation (5), and the resulting value is transmitted to the controller 140.

[Math. 5]

$$\Delta\varphi_{m_1}(k+1) = \xi_{m_1} + \varphi_{m_1}(k) = \tan^{-1}\left\{\frac{q_Q(k+1)}{q_I(k+1)}\right\} \tag{5}$$

The controller 140 controls the power transmission phase for the antenna element $m_1$ so as to either negate the received power transmission phase or to achieve a specific phase. The power transmission phase determined by the phase control is reflected in the power feeding period after time slot k+5.

[Math. 6]

$$\varphi_{m_1}(k+5) = \varphi_{m_1}(k) - \Delta_{\varphi_{m_1}}(k+1) \tag{6}$$

When the power is transmitted from the antenna element $m_1$ in power transmission phase $\varphi_{m1}$ (k+5) after time slot k+5, a power reception phase $\varphi_{m1}$ (k+5) in which the power transmission signal transmitted the antenna element $m_1$ is received by the antenna 51 of the specific device 50A is aligned in an in-phase axis direction, and for example, the power reception phase $\varphi_{m1}$ (k+5) is set at zero in the following equation (7).

[Math. 7]

$$\Phi_{m_1}(k+5) = \xi_{m_1} + \varphi_{m_1}(k+5) = \tag{7}$$
$$\xi_{m_1} + \varphi_{m_1}(k) - \Delta\varphi_{m_1}(k+1) = \xi_{m_1} + \varphi_{m_1}(k) - \left(\xi_{m_1} + \varphi_{m_1}(k)\right) = 0$$

Optimization Process

FIG. 5 is a diagram for describing an example of the optimization process. FIG. 5 shows the optimization period, the power feeding period, and time slots in one frame. In this figure, as an example, it is assumed that the antenna subset 110A includes four antenna elements 111. The optimization process includes a number of time slots equal to the number of antenna elements 111 included in the antenna subset 110A plus 1. In FIG. 5, since the antenna subset 110A includes the four antenna elements 111, the time slots in the optimization period are five slots (k to k+4). The power feeding period starts from time slot k+5 and is longer than the optimization period, but the power feeding period is simplified in this description.

The four antenna elements 111 included in the antenna subset 110A are distinguished as antenna elements $m_1$ to $m_4$. Multiple antenna elements 111 (each of which is an example of a non-selected first antenna) not included in the antenna subset 110A are donated as antennas $n_1$, . . . .

In time slot k, the power transmission phase for the antenna element $m_1$ is set at $\varphi m_1$, and the power transmission phases for the antenna elements $m_2$ to $m_4$ are set at $\varphi m_2$ to $\varphi m_4$. In this state, power transmission signals are transmitted from the antenna elements $m_1$ to $m_4$. Note that $\varphi m_1$ to $\varphi m_4$ are arbitrary power transmission phases.

In time slot k+1, the power transmission phase for the antenna element $m_1$ is changed to $\varphi m_1 + \pi$, and the power transmission phases for the antenna elements $m_2$ to $m_4$ are set at $\varphi m_2$ to $\varphi m_4$. In this state, power transmission signals are transmitted from the antenna elements $m_1$ to $m_4$. The power transmission phase $\varphi m_1 + \pi$ for the antenna element $m_1$ that is changed in the time slot k+1 is an inverted phase that is obtained by inverting the power transmission phase $\varphi m_1$ in the time slot k. In the time slots k to k+1, the power transmission phases for the antenna elements $m_2$ to $m_4$ are fixed at $\varphi m_2$ to $\varphi m_4$.

In time slot k+2, the power transmission phase of the antenna element $m_1$ is set at $\varphi m_1 + \pi$, the power transmission phase of the antenna element $m_2$ is changed to $\varphi m_2 + \pi$, and the power transmission phases of the antenna elements $m_3$ and $m_4$ are set at $\varphi m_3$ and $\varphi m_4$. In this state, the power transmission signals are transmitted from the antenna elements $m_1$ to $m_4$. The power transmission phase $\varphi m_2 + \pi$ of the antenna element $m_2$ changed in time slot k+2 is an inverted phase obtained by inverting the power transmission phase $\varphi m_2$ in the time slots k to k+1. In time slots k+1 and k+2, the power transmission phase of the antenna element $m_1$ is fixed at $\varphi m_1 + \pi$. In time slots k to k+2, power transmission phases of the antenna elements $m_3$ and $m_4$ are fixed at $\varphi m_3$ and $\varphi m_4$.

In time slot k+3, the power transmission phase for the antenna element $m_1$ is set at $\varphi m_1 + \pi$, the power transmission phase for the antenna element $m_2$ is set at $\varphi m_2 + \pi$, the power transmission phase for the antenna element $m_3$ is changed to $\varphi m_3 + \pi$, and the power transmission phase for the antenna element $m_4$ is set at $\varphi m_4$. In this state, power transmission signals are transmitted from the antenna elements $m_1$ to $m_4$. The power transmission phase $\varphi m_3 + \pi$ for the antenna element $m_3$ changed in the time slot k+3 is an inverted phase that is obtained by inverting the power transmission phase $\varphi m_3$ in time slots k to k+2. In the time slots k+1 to k+3, the power transmission phase for the antenna element $m_1$ is fixed at $\varphi m_1 + \pi$, and in the time slots k+2 and k+3, the power transmission phase for the antenna element $m_2$ is fixed at $\varphi m_2 + \pi$. In the time slots k to k+3, the power transmission phase for the antenna element $m_4$ is fixed at $\varphi m_4$.

In time slot k+4, the power transmission phase for the antenna element $m_1$ is set at $\varphi m_1 + \pi$, the power transmission phase for the antenna element $m_2$ is set at $\varphi m_2 + \pi$, the power transmission phase for the antenna element $m_3$ is set at $\varphi m_3 + \pi$, and the power transmission phase for the antenna element $m_4$ is changed to $\varphi m_4 + \pi$. In this state, power transmission signals are transmitted from the antenna elements $m_1$ to $m_4$. The power transmission phase $\varphi m_4 + \pi$ for the antenna element $m_4$ that is obtained by making changes in the time slot k+4 is an inverted phase obtained by inverting the power transmission phase $\varphi m_4$ in the time slots k to k+3. In the time slots k+1 to k+4, the power transmission phase for the antenna element $m_1$ is fixed at $\varphi m_1 + \pi$, and in the time slots k+2 to k+4, the power transmission phase for the antenna element $m_2$ is fixed at $\varphi m_2 + \pi$. In the time slots k+3 and k+4, the power transmission phase for the antenna element $m_3$ is fixed at $\varphi m_3 + \pi$.

As described above, during the optimization period of the time slots k to k+4, the optimization process is performed on the power transmission phase for the antenna element m1 in the time slots k and k+1, and from the time slot k+1 onward, the power transmission phase for the antenna element $m_1$ is fixed at $\varphi m_1 + \pi$. The optimization process of the time slot k, in which the power transmission phase for the antenna element $m_1$ is set at $\varphi m_1$ to transmit the power transmission signal, is an example of a first power transmission process for the antenna element $m_1$, and the optimization process of the time slot k+1, in which the power transmission phase for the antenna element $m_1$ is set at $\varphi m_1 + \pi$ to transmit the power transmission signal, is an example of a second power transmission process for the antenna element $m_1$. The optimization period in which the first power transmission process and the second power transmission process are performed is an example of a preparation period.

In the optimization period of the time slots k to k+4, the optimization process is performed on the power transmission phase for the antenna element $m_2$ in the time slots k+1 and k+2. In the time slots k to k1, the power transmission phase for the antenna element $m_2$ is fixed at $\varphi m_2$ and from the time slot k+2 onward, the power transmission phase for the antenna element $m_2$ is fixed at $\varphi m_2 + \pi$. The optimization process in the time slot k+1, in which the power transmission phase for the antenna element $m_2$ is set at $\varphi m_2$ to transmit the power transmission signal, is an example of a first power transmission process for the antenna element $m_2$, and the optimization process in the time slot k+2, in which the power transmission phase for the antenna element $m_2$ is set at $\varphi m_2 + \pi$ to transmit the power transmission signal, is an example of a second power transmission process for the antenna element $m_2$.

In the optimization period of the time slots k to k+4, the optimization process is performed on the power transmission phase for the antenna element $m_3$ in the time slots k+2 and k+3. In the time slots k to k2, the power transmission phase for the antenna element $m_3$ is fixed at $\varphi m_3$, and from the time slot k+3 onward, the power transmission phase for the antenna element $m_3$ is fixed at $\varphi m_3 + \pi$. The optimization process in the time slot k+2, in which the power transmission phase for the antenna element $m_3$ is set at oms to transmit the power transmission signal, is an example of a first power transmission process for the antenna element $m_3$, and the optimization process in the time slot k+3, in which the power transmission phase of the antenna element $m_3$ is set at $\varphi m_3 + \pi$ to transmit the power transmission signal, is an example of a second power transmission process for the antenna element $m_3$.

In the optimization period of the time slots k to k+4, the optimization process is performed on the power transmission phase for the antenna element $m_4$ in the time slots k+3 and k+4. In the time slots k to k3, the power transmission phase for the antenna element $m_4$ is fixed at $\varphi m_4$, and in the time slots k+4, the power transmission phase for the antenna element $m_4$ is changed to $\varphi m_4 + \pi$. The optimization process in the time slot k+3, in which the power transmission phase for the antenna element $m_4$ is set at $\varphi m_4$ to transmit the power transmission signal, is an example of a first power transmission process for the antenna element $m_4$, and the optimization process in the time slot k+4, in which the power transmission phase for the antenna element $m_4$ is set at $\varphi m_4 + \pi$ to transmit the power transmission signal, is an example of a second power transmission process for the antenna element $m_4$.

In the power feeding period, the power transmission phases for the antenna elements $m_1$ to $m_4$ are set at optimized power transmission phases, and random beamforming is performed while maintaining the relationship between four optimized power transmission phases. Also, in the optimization period, for multiple antenna elements 111 (each of which is an example of a non-selected first antenna) not included in the antenna subset 110A, the phase for each of the multiple antenna elements 111 is fixed at an arbitrary phase. In the power feeding period, for the multiple antenna elements 111 not included in the antenna subset 110A, random beamforming is performed for each of the multiple antenna elements 111 without having any relationship between the power transmission phases for the multiple antenna elements 111. The power feeding period is an example of the power transmission period.

<Power Reception Phase of Power Transmission Signal for Specific Device 50A>

FIGS. 6A to 6E are diagrams for describing the power reception phase of the power transmission signal received by the specific device 50A. The I-axis is a real axis, and the Q-axis is an imaginary axis. Four vectors (1) to (4) represent power transmission signals received by the specific device 50A from the antenna elements $m_1$ to $m_4$ in vector form.

It is assumed that the power transmission phases for antenna elements $m_1$ to $m_4$ are $\varphi m_1$ to $\varphi m_4$, respectively, and that remainders (fractional parts) obtained by dividing distances between the antenna elements m; to $m_4$ and the antenna 51 by a wavelength are $\xi m_1$ to $\xi m_4$, respectively.

As shown in FIG. 6A, power transmission phases of the power transmission signal received by the specific device 50A from the antenna elements $m_1$ to $m_4$ in the time slot k are $\xi m_1 + \varphi m_1$, $\xi m_2 + \varphi m_2$, $\xi m_3 + \varphi m_3$, and $\xi m_4 + \varphi m_4$, respectively. The four vectors (1) to (4) are as shown in FIG. 6A.

In the time slot k+1, the power reception phases of the power transmission signals received by the specific device 50A from the antenna elements $m_1$ to $m_4$ are $\xi m_1 + \varphi m_1 + \pi$, $\xi m_2 + \varphi m_2$, $\xi m_3 + \varphi m_3$, and $\xi m_4 + \varphi m_4$, respectively. The four vectors (1) to (4) are as shown in FIG. 6A, and the vector (1) is oriented in an opposite direction compared to the time slot k.

When the four vectors (1) to (4) in the time slot k+1 are subtracted from the four vectors (1) to (4) in the time slot k, the vectors (2) to (4) are eliminated, and only a vector (1A), which has twice the magnitude of the vector (1), remains as the difference. A signal representing the vector (1A) is a difference signal, and is obtained by the calculation unit 56 through subtraction processing. An angle of the vector (1A) with respect to the I-axis is $\alpha 1$. The angle $\alpha 1$ is obtained by the angle conversion unit 57. The four vectors (1) to (4) in the time slot k are an example of a first combined signal, and the four vectors (1) to (4) in the time slot k+1 are an example of a second combined signal.

Figure 6B:
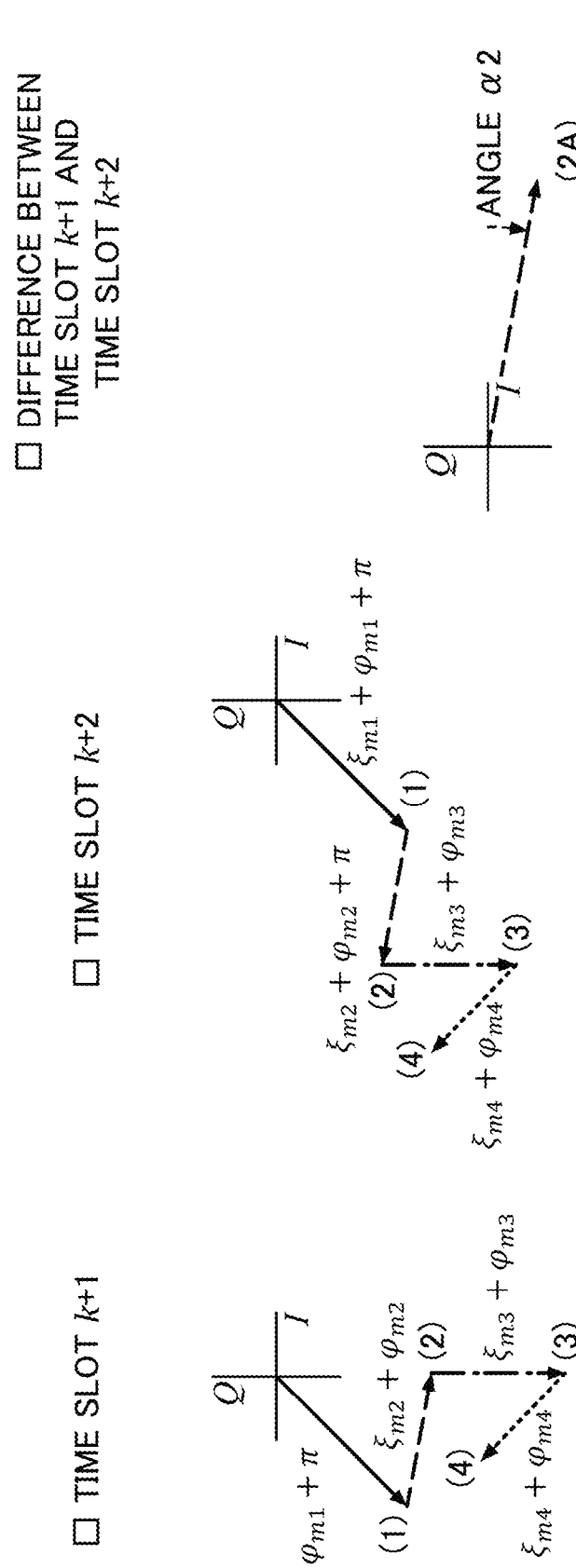
FIG. 6B is a diagram showing power reception phases of power transmission signals received by the specific device 50A.

As shown in FIG. 6B, power reception phases of the power transmission signals received by the specific device 50A from the antenna elements $m_1$ to $m_4$ in the time slot k+1 are $\xi m_1 + \varphi m_1 + \pi$, $\xi m_2 + \varphi m_2$, $\xi m_3 + \varphi m_m$, and $\xi m_4 + \varphi m_4$, respectively. The four vectors (1) to (4) are as shown in FIG. 6B.

The power reception phases of the power transmission signals received by the specific device 50A from the antenna elements $m_1$ to $m_4$ in the time slot k+2 are $\xi m_1 + \varphi m_1 + \pi$, $\xi m_2 + \varphi m_2 + \pi$, $\xi m_3 + \varphi m_3$, and $\xi m_4 + \varphi m_4$, respectively. The four vectors (1) to (4) are as shown in FIG. 6B, and the vector (2) is oriented in the opposite direction compared to the time slot k+1.

When the four vectors (1) to (4) in the time slot k+2 are subtracted from the four vectors (1) to (4) in the time slot k+1, the vectors (1), (3), and (4) are eliminated, and only a vector (2A), which has twice the magnitude of the vector (2), remains as the difference. A signal representing the vector (2A) is a difference signal, and is obtained by the calculation unit 56 through subtraction processing. An angle of the vector (2A) with respect to the I-axis is $\alpha 2$. The angle $\alpha 2$ is obtained by the angle conversion unit 57. The four vectors (1) to (4) in the time slot k+1 are an example of a first combined signal, and the four vectors (1) to (4) in the time slot k+2 are an example of a second combined signal.

Figure 6C:
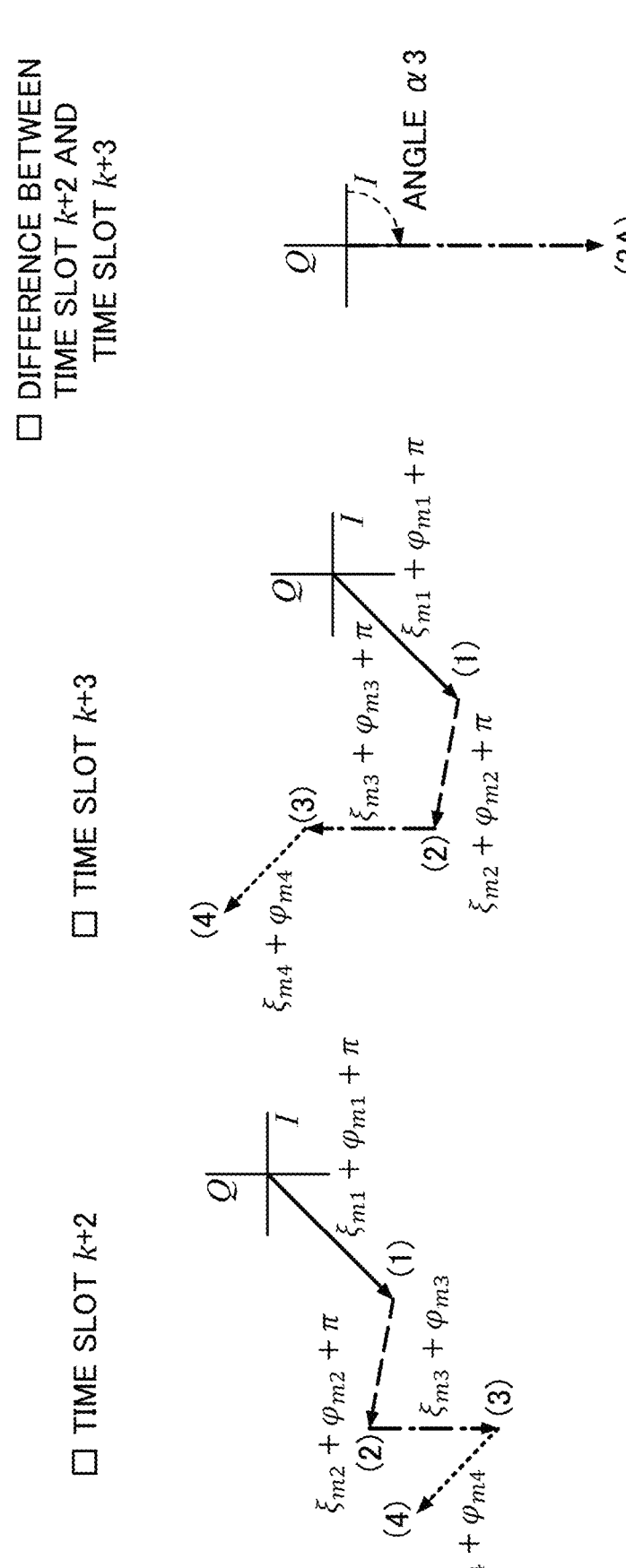
FIG. 6C is a diagram showing power reception phases of power transmission signals received by the specific device 50A.

As shown in FIG. 6C, power reception phases of the power transmission signals received by the specific device 50A from the antenna elements $m_1$ to $m_4$ in the time slot k+2 are $\xi m_1+\varphi m_1+\pi$, $\xi m_2+\varphi m_2+\pi$, $\xi m_3+\varphi m_3$, and $\xi m_4+\varphi m_4$, respectively. The four vectors (1) to (4) are as shown in FIG. 6C.

The power reception phases of the power transmission signals received by the specific device 50A from the antenna elements $m_1$ to $m_4$ in the time slot k+3 are $\xi m_1+\varphi m_1+\pi$, $\xi m_2+\varphi m_2+\pi$, $\xi m_3+\varphi m_3+\pi$, and $\xi m_4+\varphi m_4$, respectively. The four vectors (1) to (4) are as shown in FIG. 6C, and the vector (3) is oriented in the opposite direction compared to the time slot k+2.

When the four vectors (1) to (4) in the time slot k+3 are subtracted from the four vectors (1) to (4) in the time slot k+2, the vectors (1), (2), and (4) are eliminated, and only a vector (3A), which has twice the magnitude of the vector (3), remains as the difference. A signal representing the vector (3A) is a difference signal, and is obtained by the calculation unit 56 through subtraction processing. An angle of the vector (3A) with respect to the I-axis is α3. The angle α3 is obtained by the angle conversion unit 57. The four vectors (1) to (4) in the time slot k+2 are an example of a first combined signal, and the four vectors (1) to (4) in the time slot k+3 are an example of a second combined signal.

Figure 6D:
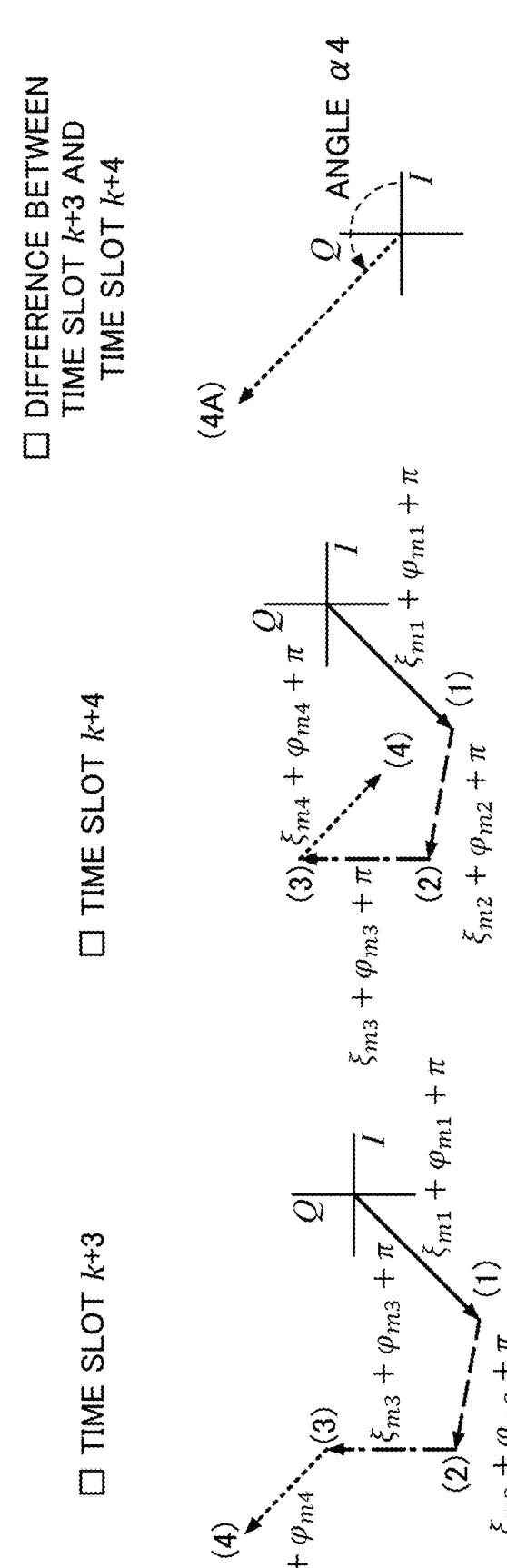
FIG. 6D is a diagram showing power reception phases of power transmission signals received by the specific device 50A.

As shown in FIG. 6D, power reception phases of the power transmission signals received by the specific device 50A from the antenna elements $m_1$ to $m_4$ in the time slot k+3 are $\xi m_1+\varphi m_1+\pi$, $\xi m_2+\varphi m_2+\pi$, $\xi m_3+\varphi m_3+\pi$, and $\xi m_4+\varphi m_4$, respectively. The four vectors (1) to (4) are as shown in FIG. 6D.

The power reception phases of the power transmission signals received by the specific device 50A from the antenna elements $m_1$ to $m_4$ in the time slot k+4 are $\xi m_1+\varphi m_1+\pi$, $\xi m_2+\varphi m_2+\pi$, $\xi m_3+\varphi m_3+\pi$, and $\xi m_4+\varphi m_4+\pi$, respectively. The four vectors (1) to (4) are as shown in FIG. 6D, and the vector (4) is oriented in the opposite direction compared to the time slot k+3.

When the four vectors (1) to (4) in the time slot k+4 are subtracted from the four vectors (1) to (4) in the time slot k+3, the vectors (1) to (3) are eliminated, and only a vector (4A), which has twice the magnitude of the vector (4), remains as the difference. A signal representing the vector (4A) is a difference signal, and is obtained by the calculation unit 56 through subtraction processing. An angle of the vector (4A) with respect to the I-axis is α4. The angle α4 is obtained by the angle conversion unit 57. The four vectors (1) to (4) in the time slot k+3 are an example of a first combined signal, and the four vectors (1) to (4) in the time slot k+4 are an example of the second combined signal.

When the angle conversion unit 57 obtains the angles α1 to α4 for the vectors (1) to (4) as described above, the communication unit 58 transmits angle data representing the angles α1 to α4 to the power feeding apparatus 100 at the last timing of the time slot k+4.

Figure 6E:
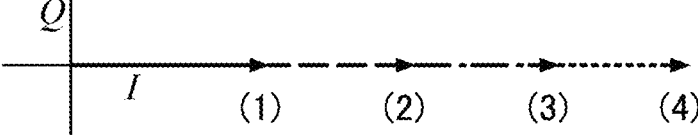
FIG. 6E is a diagram showing power reception phases of power transmission signals received by the specific device 50A.

The power transmission control unit 143 adjusts the phases for the vectors (1) to (4) to adjust the angles α1 to α4 in the time slot k+5. As a result, directions of the vectors (1) to (4) can be aligned as shown in FIG. 6E. In FIG. 6E, the directions of the vectors (1) to (4) are along the I-axis as an example, but may have an angle greater than 0 degrees with respect to the I-axis.

In this arrangement, the angles for the vectors (1) to (4) can be aligned. That is, the received power of the specific device 50A can be maximized.

In the power feeding period after the time slot k+5, random beamforming is performed while maintaining the relationship between the four power transmission phases for the antenna elements $m_1$ to $m_4$, such that the angles for vectors (1) to (4) are aligned. For multiple antenna elements 111 not included in the antenna subset 110A, random beamforming is performed without setting any particular relationship between the power transmission phases for the multiple antenna elements 111.

Ranking for Selecting Antenna Elements 111 of the Antenna Subset 110A

The power feeding apparatus 100 receives signals including angle data via all antenna elements 111, and the IC chip 125 measures RSSI of the received power. The subset selection unit 142 selects antenna elements 111 included in the antenna subset 110A by performing ranking based on the RSSI of the signals including the angle data that are received by all the antenna elements 111.

Figure 7:
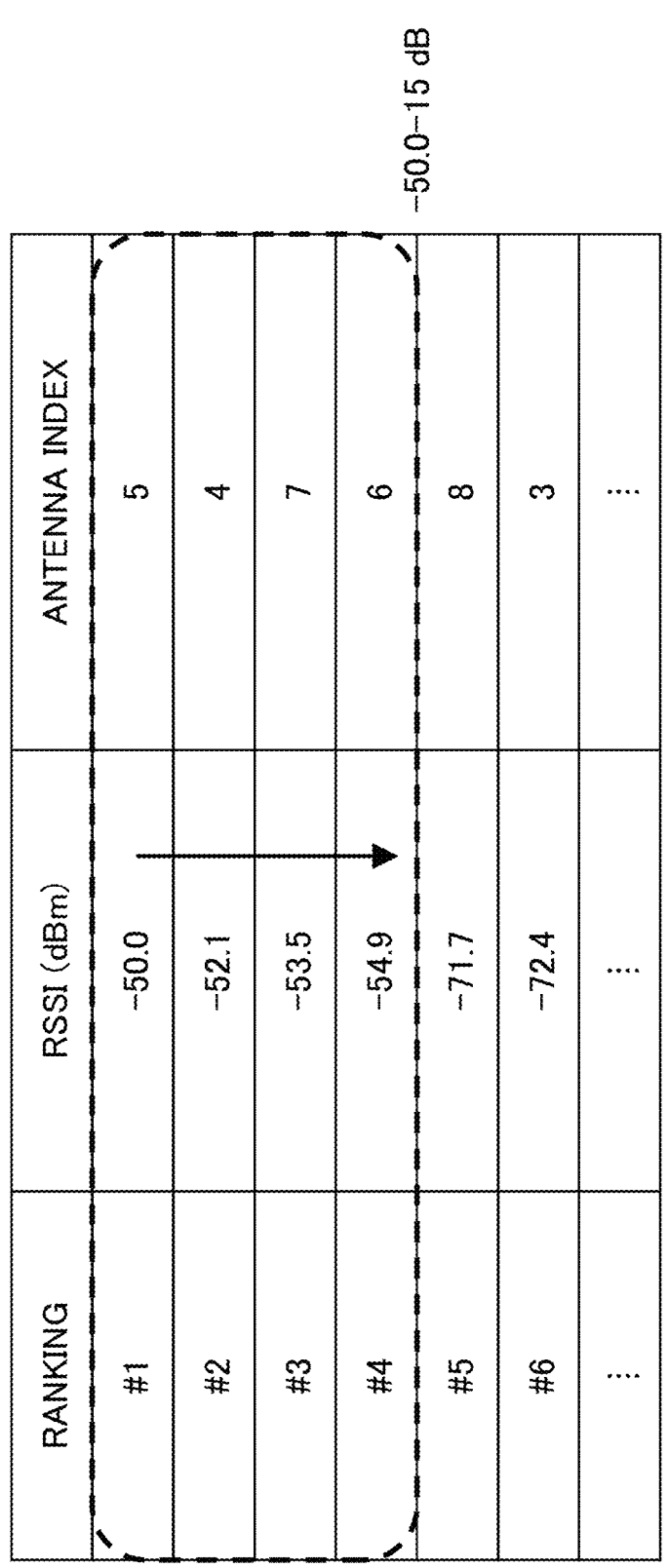
FIG. 7 is a diagram showing an example of a ranking result.

FIG. 7 is a diagram showing an example of a ranking result. FIG. 7 shows the ranking (in descending order of RSSI), RSSI (dBm), and antenna index. As an example, one or more antenna elements 111 are selected up to −15 dB relative to the antenna element 111 with the highest RSSI.

In FIG. 7, as an example, the antenna element 111 with the antenna index No. 5 has the highest RSSI of −50.0 dBm, and four antenna elements 111 ranked up to the fourth place, up to a 15 dB drop (up to −50.0-15 dB) relative to −50.0 dBm, are selected as antenna elements 111 included in the antenna subset 110A. In this example, a case where the antenna subset 110A includes the four antenna elements 111 is described, but since the number of antenna elements 111 included in the antenna subset 110A in each frame is determined by the number of antenna elements 111 within the 15 dB drop from the highest RSSI, the number of antenna elements 111 may be either more or less than four.

Flowchart

FIG. 8 is a flowchart showing an example of processing executed by the controller 140 and the specific device 50A in the power feeding system 300. Although the controller 140 and the specific device 50A perform processing separately, the processing will be described as a series of processing in the power feeding system 300. The processing shown in FIG. 8 is performed within one frame, and the same processing is performed in each frame.

The power transmission control unit 143 selects antenna elements 111 included in the antenna subset 110A one by one, and sequentially transmits a power transmission signal and a power transmission signal of an inverted phase (step S1). For example, processing is performed in time slots k to k+4, as shown in FIG. 5.

The specific device 50A determines angle data from a difference signal (step S2).

The specific device 50A transmits a beacon signal including the angle data to the power feeding apparatus 100 (step S3). The processing in step S3 is performed, for example, at the end of time slot k+4, as shown in FIG. 5.

After step S3, the processing in steps S4A and S5A and the processing in steps S4B and S5B are performed in parallel.

The power transmission control unit 143 causes multiple antenna elements 111 included in the antenna subset 110A to transmit power by random beamforming while maintaining the relationship between optimized power transmission phases, and causes antenna elements 111 not included in the antenna subset 110A to transmit power by random beamforming (step S4A). For example, the power transmission in step S4A is performed during the power feeding period after the time slot k+5 in FIG. 5.

The specific device 50A receives power transmission signals transmitted in step S4A (step S5A). For example, since the power transmission in step S4A is performed during the power feeding period after the time slot k+5 in FIG. 5, the specific device 50A receives the power transmission signals during the power feeding period.

The processing in steps S4A and S5A is performed until the end of the frame.

The IC chip 125 for each antenna element 111 measures RSSI of the beacon signal and transfers the RSSI to the controller 140 (step S4B).

The subset selection unit 142 of the controller 140 selects one or more antenna elements 111 included in the antenna subset 110A based on a ranking result of the RSSI (step S5B). The antenna elements 111 selected based on the ranking result are used as antenna elements 111 included in the antenna subset 110A in a subsequent frame.

When the processing in steps S4A and S5A and the processing in steps S4B and S5B are completed, the frame ends (step S6). When processing within one frame is completed in step S6, the flow returns to step S1.

Simulation

Figure 9:
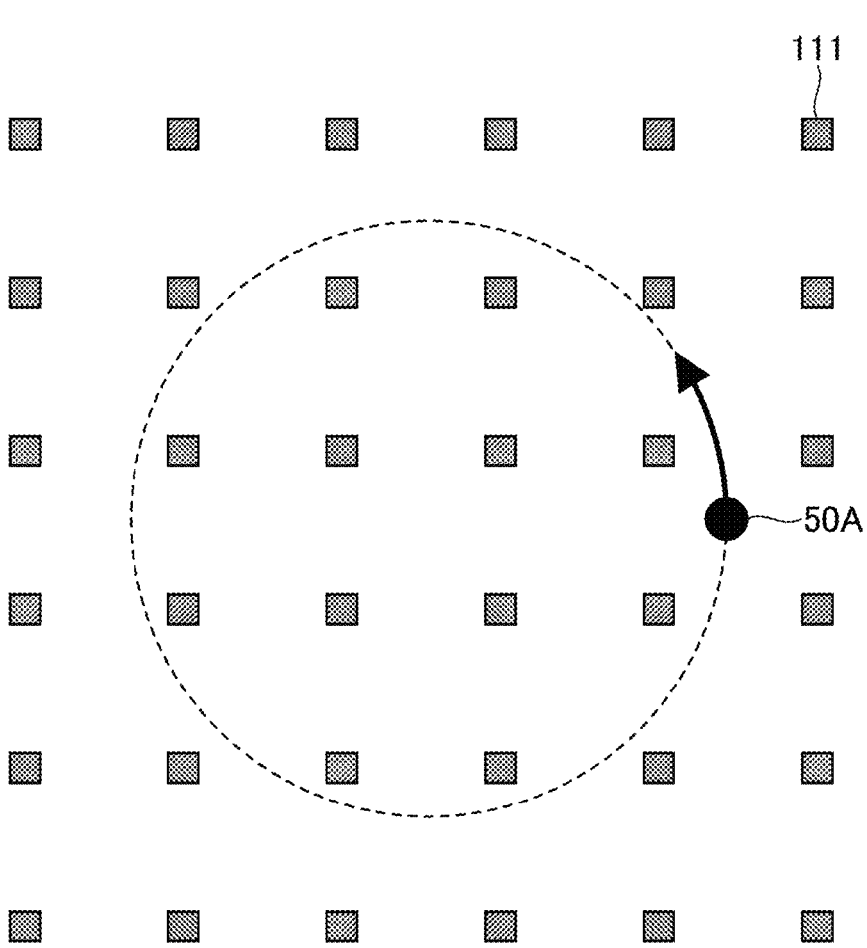
FIG. 9 is a diagram for describing an example of a simulation condition.

FIG. 9 is a diagram for describing an example of a simulation condition. As an example, a simulation is performed for power feeding to the specific device 50A with 36 antenna elements 111 in a 6×6 array. The specific device 50A moves along an orbit of a dotted circle at a speed of 2.0 m/sec.

In the simulation for the power feeding system 300, the simulation is performed for an amount of power received by the specific device 50A, where multiple antenna elements 111 included in the antenna subset 110A are selected based on the ranking result of RSSI, power transmission is performed by random beamforming while maintaining the relationship between optimized power transmission phases for the multiple antenna elements 111 included in the antenna subset 110A, and power transmission is performed by random beamforming for antenna elements 111 not included in the antenna subset 110A.

For comparison, a simulation is also performed for the amount of power received by the specific device 50A when power transmission is performed by random beamforming from all (36) antenna elements 111 without setting the antenna subset 110A.

Figure 10:
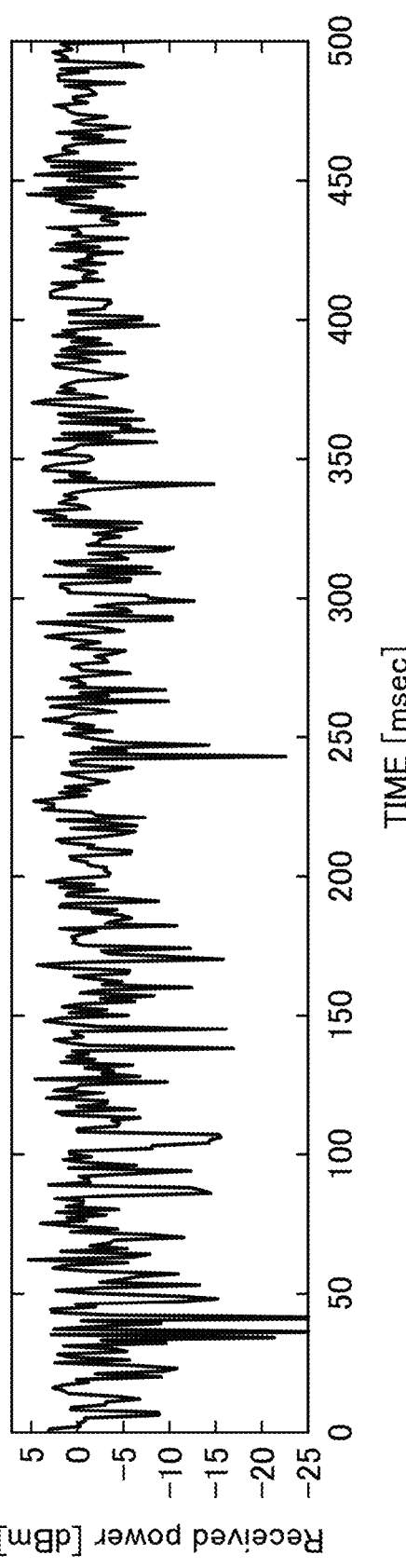
FIG. 10 is a diagram showing an example of a simulation result for received power when power transmission is performed by random beamforming for comparison.

FIG. 10 is a diagram showing an example of the simulation result for the received power when the power transmission is performed by random beamforming for comparison. In FIG. 10, the horizontal axis represents time, and the vertical axis represents received power (dBm). When the power transmission is performed by random beamforming from all (36) antenna elements 111, the received power repeatedly fluctuates around 0 (dBm), and shows large variations with time.

Figure 11:
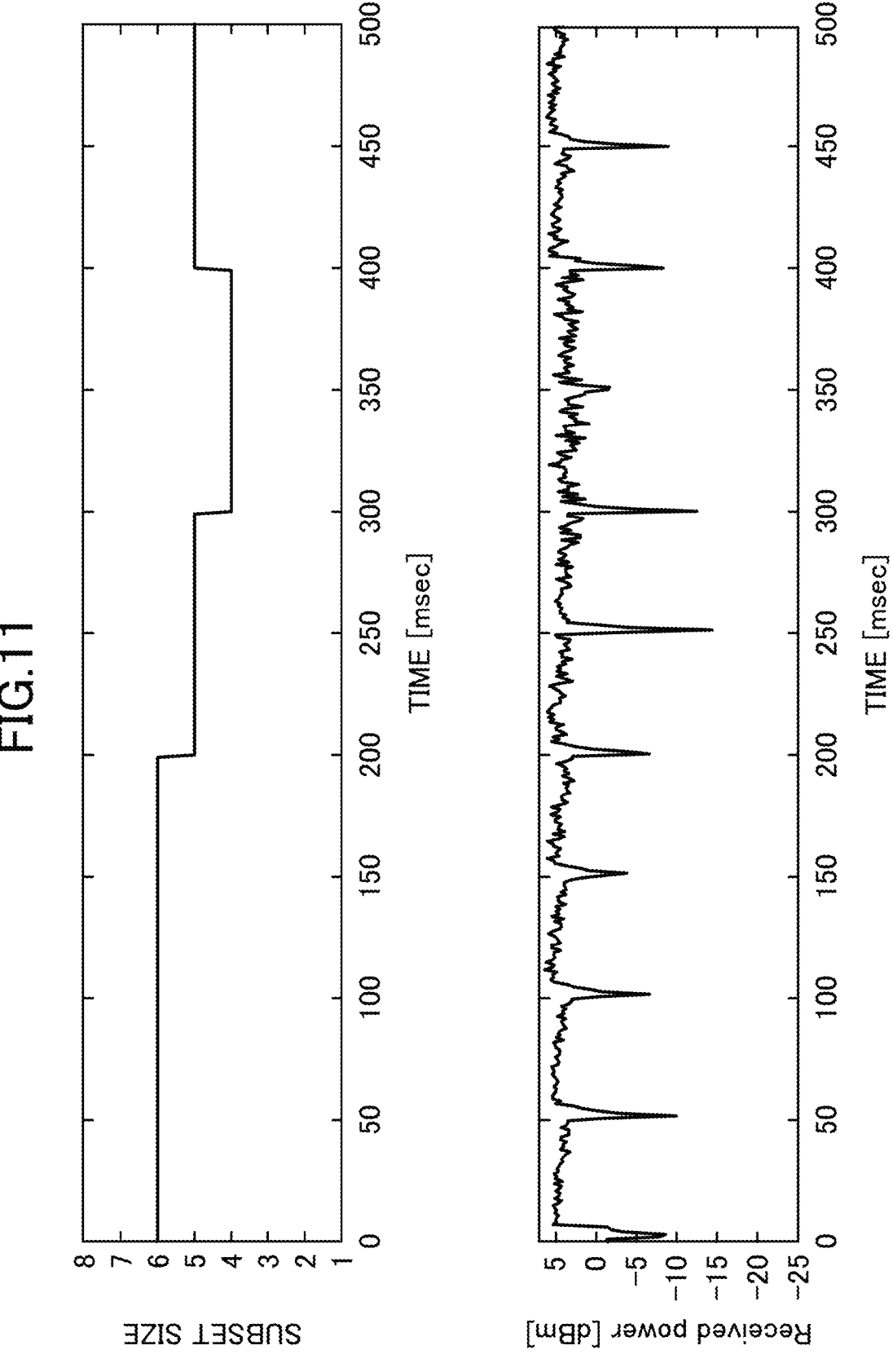
FIG. 11 is a diagram showing an example of the simulation result for a power feeding system 300.

FIG. 11 is a diagram showing an example of the simulation result for the power feeding system 300. The upper part of FIG. 11 shows temporal changes in the number of antenna elements 111 included in the antenna subset 110A. In the upper graph of FIG. 11, the horizontal axis represents time, and the vertical axis represents the number of antenna elements 111 included in the antenna subset 110A. In the lower graph of FIG. 11, the horizontal axis represents time, and the vertical axis represents received power (dBm).

As shown in the lower graph of FIG. 11, the received power is higher than the received power shown in FIG. 10, with many periods of 5 dBm to 6 dBm. A frame period is 50 ms, and a period in which the received power is low at the beginning of each frame is considered to be the optimization period. In the power feeding period after the optimization period ends, received power of 5 dBm to 6 dBm is obtained.

The upper graph in FIG. 11 shows that the number of antenna elements 111 included in the antenna subset 110A is 4 to 6. By comparing the upper and lower graphs in FIG. 11, it is confirmed that a greater received power unit is obtained during periods in which there is a larger number of antenna elements 111 included in the antenna subset 110A.

Effects

A power feeding system 300 includes a power feeding apparatus 100, and a specific device 50A configured to receive power transmission signals transmitted from the power feeding apparatus 100. The power feeding apparatus 100 includes an array antenna 110 including a plurality of antenna elements 111 configured to transmit power, and a power transmission control unit configured to control phases of the power 143 transmission signals that are to be transmitted from the plurality of antenna elements 111 to the specific device 50A, and control power transmission. The power transmission control unit 143 is configured to: select one of a plurality of first antennas included in the plurality of elements antenna 111; and while transmitting a first power transmission signal having a fixed power transmission phase for a non-selected first antenna (antenna element 111 not selected as a target of an optimization process, among antenna elements 111 in an antenna subset 110A) among the plurality of first antennas, perform, while selecting the plurality of first antennas one by one, both a first power transmission process of transmitting a first power transmission signal having a predetermined phase from the selected first antenna (antenna element 111 selected as the target of the optimization process among the antenna elements 111 included in the antenna subset 110A), and a second power transmission process of transmitting a first power transmission signal having an inverted phase obtained by inverting the predetermined phase from the selected first antenna. The specific device 50A is configured to: determine a difference signal between a first combined signal, which combines the first power transmission signal having the predetermined phase and the first power transmission signal having the fixed power transmission phase, the first power transmission signals being both received from the plurality of first antennas in the first power transmission process, and a second combined signal, which combines the first power transmission signal having the inverted phase and the first power transmission signal having the fixed power transmission phase, the first power transmission signals being both received from the plurality of first antennas in the second power transmission process; and transmit the difference signal to the power transmission control unit 143. The power transmission control unit 143 is configured to control phases of the plurality of first power transmission signals transmitted by the plurality of first antennas, based on a plurality of difference signals obtained by selecting each of the plurality of first antennas. In this arrangement, phases capable of increasing received power of a power receiving device can be promptly set.

In this arrangement, it is possible to provide a power feeding system 300 capable of promptly setting phases for increasing received power of a power receiving device.

Also, in a second transmission process, a power transmission control unit 143 is configured to set a power transmission phase to an inverted phase for a first antenna that has already been selected in a first transmission process (antenna element 111 that has been already selected as a target of an optimization process, among antenna elements 111 included in an antenna subset 110A). In this arrangement, it is possible to provide a power feeding system 300 capable of promptly setting phases for increasing received power of a power receiving device. For the antenna element 111 that has already been selected as the target of the optimization process, among the antenna elements 111 included in the antenna subset 110A, by fixing the antenna element 111 at the inverted phase, no unnecessary process occurs, and phases capable of increasing received power of a power receiving device can be set more promptly.

In a first power transmission process and a second power transmission process, a power transmission control unit 143 is configured to fix power transmission phases for one or more second antennas (antenna elements 111 not included in an antenna subset 110A) other than the plurality of first antennas (antenna elements 111 included in the antenna subset 110A), among the plurality of antenna elements 111.

In this arrangement, it is possible to determine a plurality of difference signals while suppressing the influence of power transmission signals from one or more second antennas (antenna elements 111 not included in the antenna subset 110A), to thereby provide a power feeding system 300 capable of setting phases for increasing received power of a power receiving device with higher accuracy and more promptly.

Further, it is possible to provide a power feeding system 300 capable of simultaneously achieving both power feeding to a specific power receiving device (specific device 50A) and power feeding to a power receiving device other than the specific power receiving device.

A power feeding apparatus 100 further includes a subset selection unit 142 configured to: among the plurality of antennas, select, as the plurality of first antennas (antenna elements 111 included in an antenna subset 110A), multiple antenna elements 111 having reception strength of a signal transmitted from a power receiving device that is equal to or greater than a predetermined strength, and select, as one or more second antennas (antenna elements 111 not included in the antenna subset 110A), multiple antenna elements 111 having the reception strength less than the predetermined strength.

In this arrangement, a plurality of antenna elements 111 having reception strength that is equal to or greater than a predetermined strength (having a ranking that is equal to or greater than a predetermined rank) can be selected as antenna elements 111 included in an antenna subset 110A, and power can be efficiently fed to a specific device 50A using an antenna subset 110A that is composed of multiple antenna elements 111 that are close to the specific device 50A.

Moreover, a signal transmitted from a power receiving device is a signal representing a difference signal. In this arrangement, transmission of angle data, and RSSI for ranking measurement can be performed simultaneously by using a signal including the angle data representing the difference signal. Thus, a power feeding system 300 capable of promptly and efficiently setting phases for increasing received power of a power receiving device can be provided.

Further, a power transmission control unit 143 is configured to repeatedly perform a frame process including a preparation period (optimization period) for performing a first transmission process and a second transmission process; and a power transmission period (power feeding period) for transmitting power from a plurality of first antennas (antenna elements 111 included in an antenna subset 110A) to a specific device 50A by controlling phases of a plurality of first power transmission signals transmitted from the plurality of first antennas based on a plurality of difference signals, and to use, among a plurality of antenna elements 111, the plurality of first antennas that are selected by an antenna selection unit 142 based on reception strength (RSSI) of signals (beacon signals including angle data) representing the difference signals, as the plurality of first antennas for a subsequent frame of a current frame.

In this arrangement, antenna elements 111 included in the antenna subset 110A in a subsequent frame can be selected based on reception strength (RSSI) of signals representing difference signals (beacon signals including angle data).

A specific device 50A is movable. In this arrangement, it is possible to provide a power feeding system 300 capable of promptly setting phases for increasing received power of the specific device 50A, even when phases of received power transmission signals change as the specific device 50A moves.

Furthermore, a power transmission control unit 143 is configured to control power transmission phases of a plurality of first power transmission signals transmitted by a plurality of first antennas such that power reception phases of the plurality of first power transmission signals received by a specific device 50A from the plurality of first antennas are aligned based on a plurality of difference signals. In this arrangement, the power transmission phases of the first power transmission signals can be controlled such that received power of the specific device 50A is maximized, and the received power of the specific device 50A can be reliably increased.

A power feeding apparatus 100 for transmitting power transmission signals to a specific device 50A includes an array antenna including a plurality of antenna elements 111 configured to transmit power, and a power transmission control unit 143 configured to control phases of the power transmission signals that are to be transmitted from the plurality of antenna elements 111 to the specific device 50A, and control power transmission. The power transmission control unit 143 is configured to select one of a plurality of first antennas included in the plurality of antenna elements 111; while transmitting a first power transmission signal having a fixed power transmission phase for a non-selected first antenna (antenna element 111 not selected as a target of an optimization process, among antenna elements 111 included in an antenna subset 110A) among the plurality of first antennas, perform, while selecting the plurality of first antennas one by one, both a first power transmission process of transmitting a first power transmission signal having a predetermined phase from the selected first antenna (antenna element 111 selected as the target of the optimization process among the antenna elements 111 included in the antenna subset 110A), and a second power transmission process of transmitting a first power transmission signal having an inverted phase obtained by inverting the predetermined phase from the selected first antenna; and control phases of the plurality of first power transmission signals transmitted by the plurality of first antennas, based on a plurality of difference signals obtained by selecting each of the plurality of first antennas. Each of the plurality of difference signals is a difference signal between a first combined signal, which combines the first power transmission signal having the predetermined phase and the first power transmission signal having the fixed power transmission phase, the first power transmission signals being both received by a specific device 50A from the plurality of first antennas in the first power transmission process, and a second combined signal, which combines the first power transmission signal having the inverted phase and the first power transmission signal having the fixed power transmission phase, the first power transmission signals being both received by the specific device 50A from the plurality of first antennas in the second power transmission process. In this arrangement, phases capable of increasing received power of a power receiving device can be promptly set.

In this arrangement, a power feeding apparatus 100 capable of promptly setting phases for increasing received power of a power receiving device can be provided.

A power feeding method is executed by a power feeding system 300 including a power feeding apparatus 100, and a specific device 50A configured to receive power transmission signals transmitted from the power feeding apparatus 100, and the power feeding apparatus 100 includes an array antenna 110 including a plurality of antenna elements 111 configured to transmit power, and includes a power transmission control unit 143 configured to control phases of the power transmission signals that are to be transmitted from the plurality of antenna elements 111 to the specific device 50A, and control power transmission. The power feeding method includes:

by the power transmission control unit 143, selecting one of a plurality of first antennas included in the plurality of antenna elements 111, while transmitting a first power transmission signal having a fixed power transmission phase for a non-selected first antenna (antenna element 111 not selected as a target of an optimization process, among antenna elements 111 included in an antenna subset 110A) among the plurality of first antennas, performing, while selecting the plurality of first antennas one by one, both a first power transmission process of transmitting a first power transmission signal having a predetermined phase from the selected first antenna (antenna element 111 selected as the target of the optimization process, among the antenna elements 111 included in the antenna subset 110A); and a second power transmission process of transmitting a first power transmission signal having an inverted phase obtained by inverting the predetermined phase from the selected first antenna;

by the specific device 50A, determining a difference signal between a first combined signal, which combines the first power transmission signal having the predetermined phase and the first power transmission signal having the fixed power transmission phase, the first power transmission signals being both received from the plurality of first antennas in the first power transmission process, and a second combined signal, which combines the first power transmission signal having the inverted phase and the first power transmission signal having the fixed power transmission phase, the first power transmission signals being both received from the plurality of first antennas in the second power transmission process, and transmitting the difference signal to the power transmission control unit 143; and by the power transmission control unit 143, controlling phases of the plurality of first power transmission signals transmitted by the plurality of first antennas, based on a plurality of difference signals obtained by selecting each of the plurality of first antennas. With this approach, phases capable of increasing received power of a power receiving device can be promptly set.

With this approach, a power feeding method capable of promptly setting phases for increasing received power of a power receiving device can be provided.

Modifications

FIG. 12 is a diagram for describing an example of the optimization process in the power feeding system 300 in a modification of the embodiment. Similar to FIG. 5, FIG. 12 shows the optimization period, power feeding period, and time slots in one frame. As an example, it is assumed that the antenna subset 110A includes four antenna elements 111. The optimization process includes a number of time slots that is twice the number of antenna elements 111 included in the antenna subset 110A. In FIG. 12, since the antenna subset 110A includes four antenna elements 111, the optimization period includes eight time slots (k to k+7). Also, the power feeding period starts from time slot k+8 and is longer than the optimization period. In this example, the power feeding period is shown in a simplified manner.

In the optimization process in the modification, the power transmission control unit 143 sets power transmission phases for non-selected first antenna (antenna elements 111 not selected as targets of the optimization process, among antenna elements 111 included in the antenna subset 110A) at the same value in a first transmission process and a second transmission process.

More specifically, an process optimization of transmitting a power transmission signal by setting the power transmission phase for the antenna element $m_1$ at $\varphi m_1 + \pi$ (an example of a second power transmission process for the antenna element $m_1$), and an optimization process of transmitting a power transmission signal by setting the power transmission phase for the antenna element $m_2$ at $\varphi m_2$ (an example of a first power transmission process for the antenna element $m_2$) are performed in separate time slots k+1 and k+2.

In the optimization process in the modification, an optimization process of transmitting a power transmission signal by setting the power transmission phase for the antenna element $m_2$ at $\varphi m_2 + \pi$ (an example of a second power transmission process for the antenna element $m_2$), and an optimization of process transmitting a power transmission signal by setting the power transmission phase for the antenna element $m_3$ at $\varphi m_3$ (an example of a first power transmission process for the antenna element $m_3$) are performed in separate time slots k+3 and k+4.

In the optimization process in the modification, an optimization process of transmitting a power transmission signal by setting the power transmission phase for the antenna element $m_3$ at $\varphi m_3 + \pi$ (an example of a second power transmission process for the antenna element $m_3$), and an optimization process of transmitting a power transmission signal by setting the power transmission phase of the antenna element $m_4$ at $\varphi m_4$ (an example of a first power transmission process for the antenna element ma) are performed in separate time slots k+5 and k+6.

Then, an optimization process of transmitting a power transmission signal by setting the power transmission phase for the antenna element $m_4$ at $\varphi m_4 + \pi$ (an example of a second power transmission process for the antenna element $m_4$) is performed in time slot k+7.

In this arrangement, the optimization process in the modification is slightly longer in required time than the optimization process shown in FIG. 5.

As shown in FIG. 12, after power transmission phases for the antenna elements $m_1$ to $m_4$ are optimized, these power transmission phases are fixed at the optimized power transmission phases and remain fixed during the power feeding period. However, when entering the power feeding period, random beamforming may be performed while maintaining the relationship between the optimized power transmission phases. The optimized power transmission phases for the antenna elements $m_1$ to $m_4$ are examples of phases based on difference signals.

<Power Reception Phase of Power Transmission Signal at Specific Device 50A in Modification of Embodiment>

FIGS. 13A to 13E are diagrams for describing power reception phases of power transmission signals received by the specific device 50A in the modification of the embodiment. The I-axis is the real axis, and the Q-axis is the imaginary axis. Four vectors (1) to (4) represent the power transmission signals received by the specific device 50A from the antenna elements $m_1$ to $m_4$ in vector form.

It is assumed that the power transmission phases for the antenna elements $m_1$ to $m_4$ are $\varphi m_1$ to $\varphi m_4$, respectively, and that remainders (fraction parts) obtained by dividing distances between the antenna elements $m_1$ to $m_4$ and the antenna 51 by a wavelength are $\xi m_1$ to $\xi m_4$, respectively.

Figure 13A:
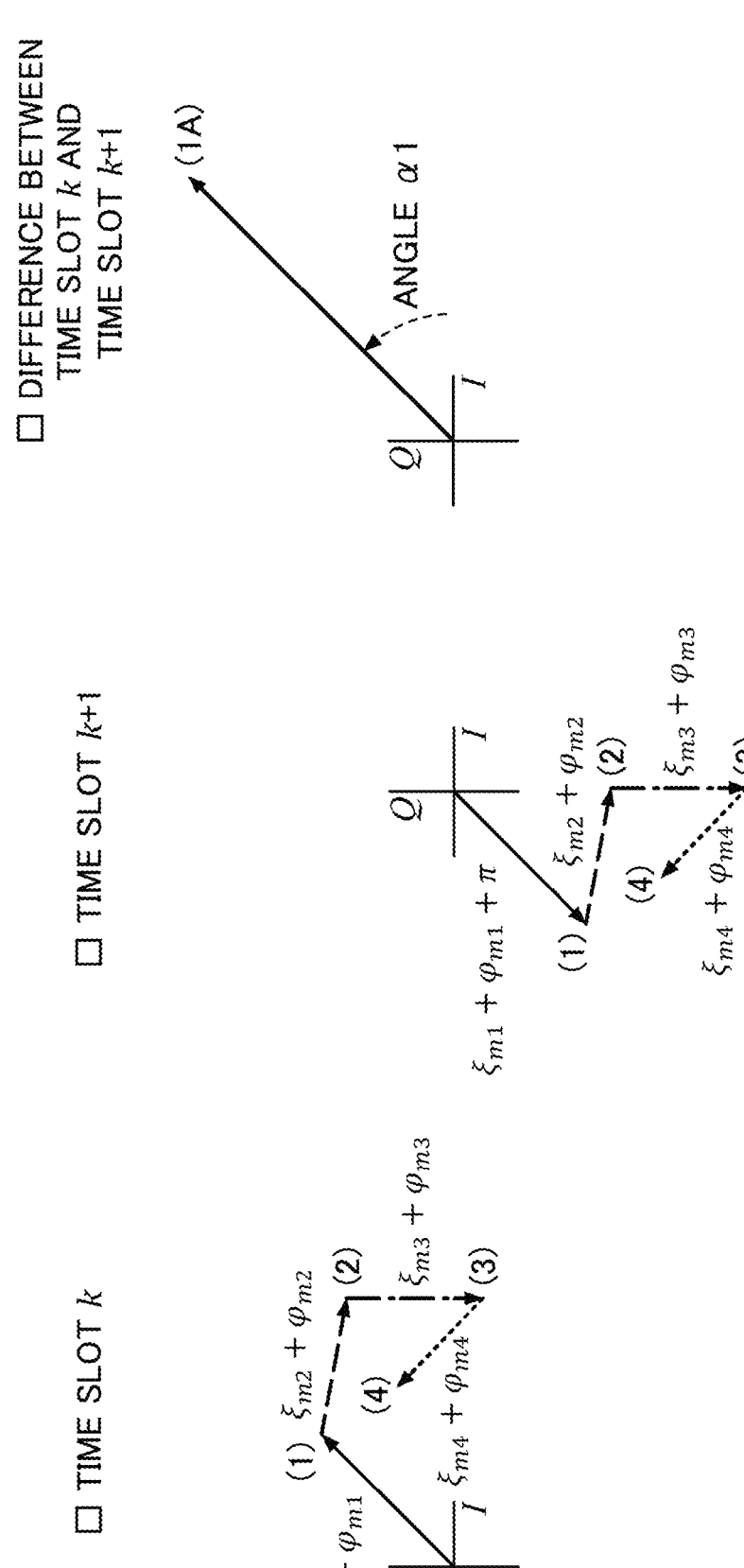
FIG. 13A is a diagram for describing the power reception phases of the power transmission signals received by the specific device 50A in the modification of the embodiment.

As shown in FIG. 13A, the power reception phases of the power transmission signals received by the specific device 50A from the antenna elements $m_1$ to $m_4$ in time slot k are $\xi m_1 + \varphi m_1$, $\xi m_2 + \varphi m_2$, $\xi m_3 + \varphi m_3$, and $\xi m_4 + \varphi m_4$, respectively. The four vectors (1) to (4) are as shown in FIG. 13A.

The power reception phases of the power transmission signals received by the specific device 50A from the antenna elements $m_1$ to $m_4$ in time slot k+1 are $\xi m_1 + \varphi m_1 + \pi$, $\xi m_2 + \varphi m_2$, $\xi m_3 + \varphi m_3$, and $\xi m_4 + \varphi m_4$, respectively. The four vectors (1) to (4) are as shown in FIG. 13A, and the vector (1) is oriented in the opposite direction compared to the time slot k.

When the four vectors (1) to (4) in time slot k+1 are subtracted from the four vectors (1) to (4) in the time slot k, vectors (2) to (4) are eliminated, and only a vector (1A), which has twice the magnitude of the vector (1), remains as the difference. A signal representing the vector (1A) is a difference signal, and is obtained by the calculation unit 56 through subtraction processing. An angle of the vector (1A) with respect to the I-axis is $\alpha 1$. The angle $\alpha 1$ is obtained by the angle conversion unit 57. At this point, a beacon signal including the angle $\alpha 1$ is transmitted to the power feeding apparatus 100 via the communication unit 58. The four vectors (1) to (4) in the time slot k are an example of a first combined signal, and the four vectors (1) to (4) in the time slot k+1 are an example of a second combined signal.

As shown in FIG. 13B, in time slot k+2, the power reception phase of the power transmission signal received from the antenna element $m_1$ by the specific device 50A is 0 degrees, and power reception phases of power transmission signals received from the antenna elements $m_2$ to $m_4$ are $m_2 + \varphi m_2$, $\xi m_3 + \varphi m_3$, and $\xi m_4 + \varphi m_4$, respectively. The four vectors (1) to (4) are as shown in FIG. 13B. When a beacon signal including the angle $\alpha 1$ is not transmitted to the power feeding apparatus 100 via the communication unit 58 in the time slot k+1, the power reception phase of the power transmission signal received from the antenna element $m_1$ by the specific device 50A in the time slot k+2 is $\alpha 1$ degrees.

The power reception phase of the power transmission signal received from the antenna element $m_1$ by the specific device 50A in time slot k+3 is 0 degrees, and power reception phases of power transmission signals received from the antenna elements $m_2$ to $m_4$ are $\xi m_2 + \varphi m_2 + \pi$, $\xi m_3 + \varphi m_3$, and $\xi m_4 + \varphi m_4$, respectively. The four vectors (1) to (4) are as shown in FIG. 13B, and the vector (2) is oriented in the opposite direction compared to the time slot k+2.

When the four vectors (1) to (4) in time slot k+3 are subtracted from the four vectors (1) to (4) in the time slot k+2, vectors (1), (3), and (4) are eliminated, and only a vector (2A), which has twice the magnitude of the vector (2), remains as the difference. A signal representing the vector (2A) is a difference signal, and is obtained by the calculation unit 56 through subtraction processing. An angle of the vector (2A) with respect to the I-axis is set at $\alpha 2$. The angle $\alpha 2$ is obtained by the angle conversion unit 57. The four vectors (1) to (4) in the time slot k+2 are an example of a first combined signal, and the four vectors (1) to (4) in the time slot k+3 are an example of a second combined signal.

Figure 13C:
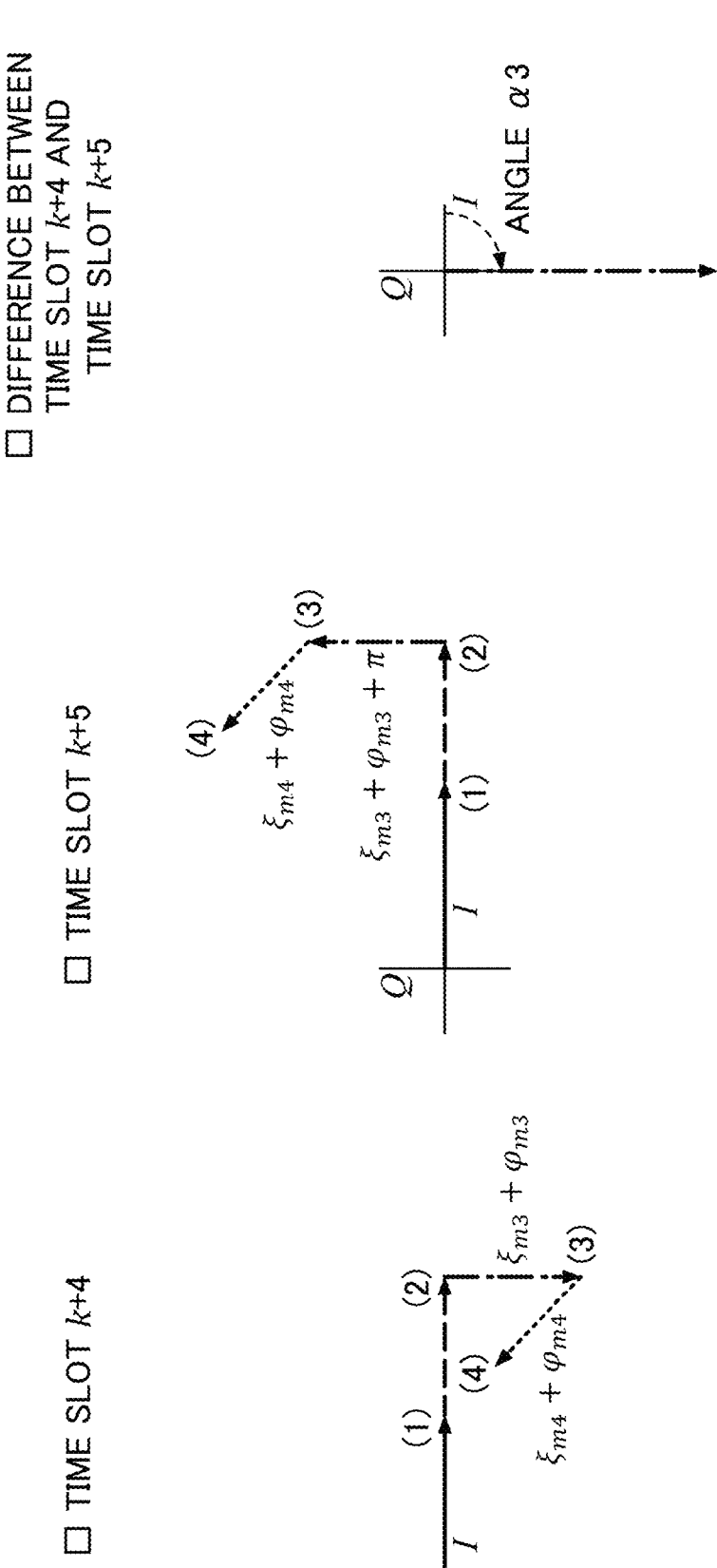
FIG. 13C is a diagram for describing the power reception phases of the power transmission signals received by the specific device 50A in the modification of the embodiment.

As shown in FIG. 13C, in time slot k+4, power reception phases of power transmission signals received by the specific device 50A from the antenna elements $m_1$ and $m_2$ are 0 degrees, and power reception phases of power transmission signals received by the antenna elements $m_3$ and $m_4$ are $\xi m_3 + \varphi m_3$ and $\xi m_4 + \varphi m_4$, respectively. The four vectors (1) to (4) are as shown in FIG. 13C. When beacon signals including the angles $\alpha 1$ and $\alpha 2$ are not transmitted to the power feeding apparatus 100 via the communication unit 58 in time slots k+1 and k+3, the power reception phases of the power transmission signals received by the specific device 50A from the antenna elements $m_1$ and $m_2$ in the time slot k+4 are $\alpha 1$ degrees and $\alpha 2$ degrees.

In time slot k+5, power reception phases of power transmission signals received by the specific device 50A from the antenna elements $m_1$ and $m_2$ are 0 degrees, and power reception phases of power transmission signals received by the antenna elements $m_3$ and $m_4$ are $\xi m_3 + \varphi m_3 + \pi$ and $\xi m_4 + \varphi m_4$, respectively. The four vectors (1) to (4) are as shown in FIG. 13C, and the vector (3) is oriented in the opposite direction compared to the time slot k+4.

When the four vectors (1) to (4) in the time slot k+5 are subtracted from the four vectors (1) to (4) in the time slot k+4, vectors (1), (2), and (4) are eliminated, and only a vector (3A), which has twice the magnitude of the vector (3), remains as the difference. A signal representing the vector (3A) is a difference signal, and is obtained by the calculation unit 56 through subtraction processing. An angle of the vector (3A) with respect to the I-axis is $\alpha 3$. The angle $\alpha 3$ is obtained by the angle conversion unit 57. The four vectors (1) to (4) in the time slot k+4 are an example of a first combined signal, and the four vectors (1) to (4) in the time slot k+5 are an example of a second combined signal.

Figure 13D:
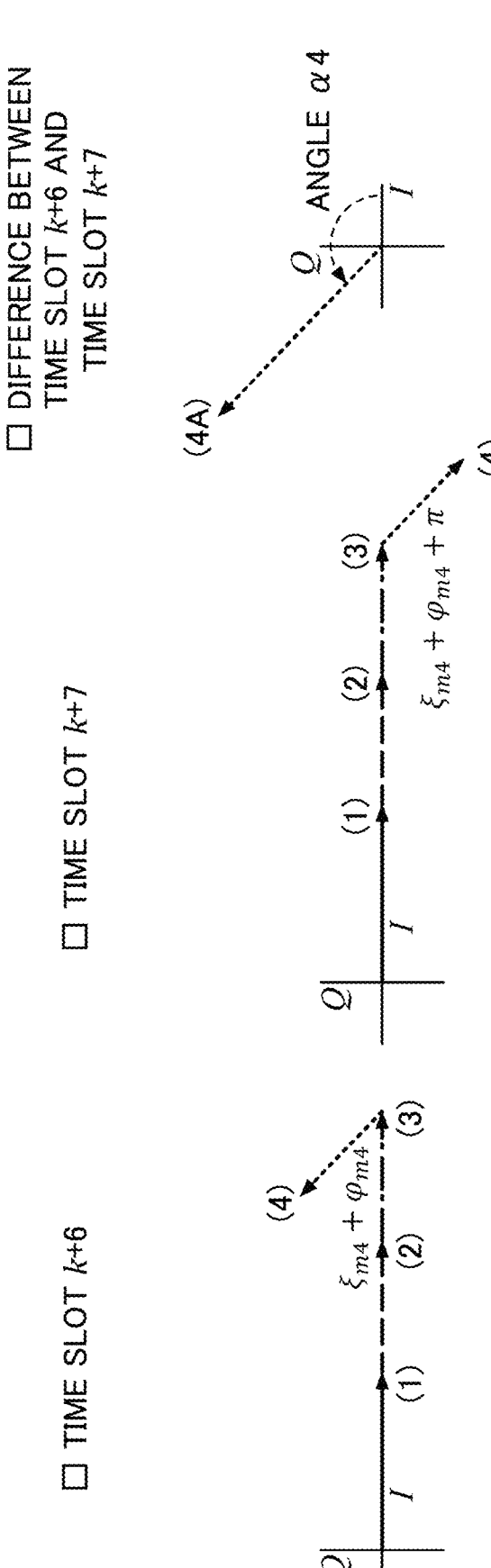
FIG. 13D is a diagram for describing the power reception phases of the power transmission signals received by the specific device 50A in the modification of the embodiment.

As shown in FIG. 13D, in time slot k+6, power reception phases of power transmission signals received from the antenna elements $m_1$ to $m_3$ by the specific device 50A are 0 degrees, and the power reception phase of the power transmission signal received from the antenna element $m_4$ is $\xi m_4 + \varphi m_4$. The four vectors (1) to (4) are as shown in FIG. 13D. When beacon signals including the angles $\alpha 1$ to $\alpha 3$ are not transmitted to the power feeding apparatus 100 via the communication unit 58 in the time slots k+1, k+3, and k+5, the power reception phases of the power transmission signals received from the antenna elements $m_1$ to $m_3$ by the specific device 50A in the time slot k+6 are $\alpha 1$ to $\alpha 3$ degrees, respectively.

The power reception phases of the power transmission signals received from the antenna elements $m_1$ to $m_3$ by the specific device 50A in time slot k+7 are 0 degrees, and the power reception phase of the power transmission signal received from the antenna element $m_4$ is $\xi m_4 + \varphi m_4 + \pi$. The four vectors (1) to (4) are as shown in FIG. 13D, and the vector (4) is oriented in the opposite direction compared to the time slot k+6.

When the four vectors (1) to (4) in the time slot k+7 are subtracted from the four vectors (1) to (4) in the time slot k+6, vectors (1) to (3) are eliminated, and only a vector (4A), which has twice the magnitude of the vector (4), remains as the difference. A signal representing the vector (4A) is a difference signal, and is obtained by the calculation unit 56 through subtraction processing. The four vectors (1) to (4) in the time slot k+6 are an example of a first combined signal, and the four vectors (1) to (4) in the time slot k+7 are an example of a second combined signal.

The angle of the vector (4A) with respect to the I-axis is $\alpha4$. The angle $\alpha4$ is obtained by the angle conversion unit 57. The communication unit 58 transmits a beacon signal including the angle $\alpha4$ to the power feeding apparatus 100.

If the beacon signals including the angles $\alpha1$ to $\alpha3$ are not transmitted to the power feeding apparatus 100 via the communication unit 58 in the time slots k+1, k+3, and k+5, the communication unit 58 may transmit angle data representing the angles $\alpha1$ to $\alpha4$ to the power feeding apparatus 100 at the end of the time slot k+7. RSSI measurement for ranking is sufficient to be performed when the power feeding apparatus 100 receives any beacon signal.

Figure 13E:
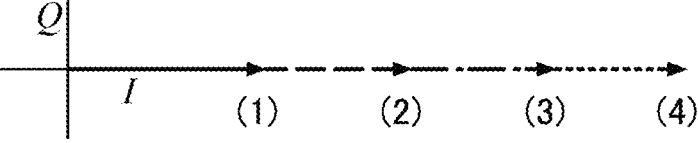
FIG. 13E is a diagram for describing the power reception phases of the power transmission signals received by the specific device 50A in the modification of the embodiment.

The power transmission control unit 143 adjusts the phases of the vectors (1) to (4) to adjust the angles $\alpha1$ to $\alpha4$ in time slot k+8. As a result, the vectors (1) to (4) can be aligned as shown in FIG. 13E. In FIG. 13E, the vectors (1) to (4) are aligned along the I-axis as an example, but may have an angle greater than 0 degrees with respect to the I-axis.

In this arrangement, the vectors (1) to (4) can be aligned. That is, the received power of the specific device 50A can be maximized.

In the feeding period after time slot k+8, power transmission may be performed in a state where the four power transmission phases for the antenna elements $m_1$ to $m_4$ optimized as shown in FIG. 13E are maintained. In the feeding period, random beamforming may be performed in a state where the relationship between the four power transmission phases for the antenna elements $m_1$ to $m_4$ is maintained, such that the angles for the vectors (1) to (4) are aligned. In addition, for multiple antenna elements 111 not included in the antenna subset 110A, random beamforming is performed without setting any particular relationship between power transmission phases of the multiple antenna elements 111.

<Simulation Result>

Figure 14:
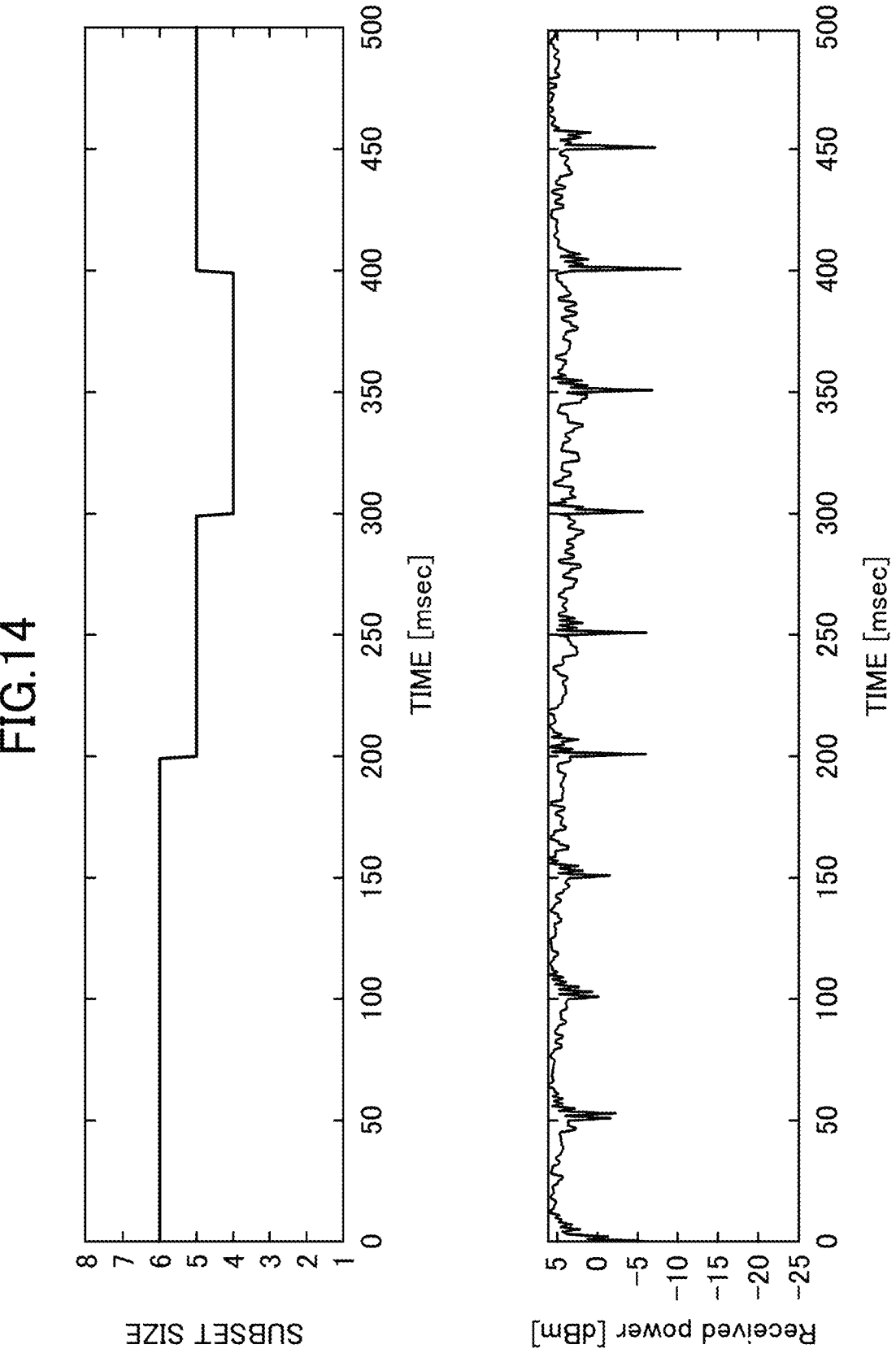
FIG. 14 is a diagram showing an example of the simulation result for the power feeding system 300 in the modification of the embodiment.

FIG. 14 is a diagram showing an example of the simulation result for the feeding system 300 in the modification of the embodiment. The upper part of FIG. 14 shows temporal changes in the number of antenna elements 111 included in the antenna subset 110A. In the upper graph of FIG. 14, the horizontal axis represents time, and the vertical axis represents the number of antenna elements 111 included in the antenna subset 110A. In the lower graph of FIG. 14, the horizontal axis represents time, and the vertical axis represents received power (dBm).

As shown in the lower graph of FIG. 14, the received power is higher than the received power shown in FIG. 10, with many periods of 5 dBm to 6 dBm. The frame period is 50 ms, and a period of low received power at the beginning of each frame is considered to be an optimization period. In the power feeding period after the optimization period ends, the received power of 5 dBm to 6 dBm is obtained.

The upper graph of FIG. 14 shows that the number of antenna elements 111 included in the antenna subset 110A is 4 to 6. By comparing the upper and lower graphs of FIG. 14, it is confirmed that the larger received power is obtained during periods in which a larger number of antenna elements 111 included in the antenna subset 110A is obtained.

Even in the modification of the embodiment, phases capable of increasing received power of a power receiving device can be promptly set. In this arrangement, the power feeding system 300 in the modification of the embodiment that is capable of promptly setting phases for increasing the received power of the power receiving device can be provided.

In addition, it is possible to provide the power feeding system 300 in the modification of the embodiment that can simultaneously achieve both power feeding to a specific power receiving device (specific device 50A) requiring a large amount of received power, and power feeding to a power receiving device other than the specific power receiving device.

The power feeding system, the power feeding apparatus, and the power feeding method according to the exemplary embodiments of the present invention have been described above, but the present invention is not limited to the specifically disclosed embodiments, and various modifications and changes can be made without departing from the scope of the claims.

This international application claims to priority Japanese patent application 2022-163333, filed on Oct. 11, 2022, the entire contents of which are incorporated herein by reference.

REFERENCE SIGNS LIST

10 region
50 device
50A specific device
50B non-specified device
51 antenna
SW switch
52 control unit
53 RF/DC conversion unit
54 battery
55 orthogonal detection unit
56 calculation unit
57 angle conversion unit
58 communication unit
100 power feeding apparatus
110 array antenna
110A antenna subset
111 antenna element
120 phase shifter
125 IC chip
130 microwave generator
140 controller
141 main control unit
142 subset selection unit
143 power transmission control unit
144 memory

The invention claimed is:
1. A power feeding system comprising:
a power feeding apparatus; and
a power receiving device configured to receive power transmission signals transmitted from the power feeding apparatus, wherein the power feeding apparatus includes an array antenna including a plurality of antennas configured to transmit power, and a power transmission control circuit configured to control phases of the power transmission signals that are to be transmitted from the plurality of antennas to the power receiving device, and control power transmission, wherein the power transmission control circuit is configured to select one of a plurality of first antennas included in the plurality of antennas, and while transmitting a first power transmission signal having a fixed power transmission phase for a non-selected first antenna among the plurality of first antennas, perform, while selecting the plurality of first antennas one by one, both:

a first power transmission process of transmitting a first power transmission signal having a predetermined phase from the selected first antenna, and a second power transmission process of transmitting a first power transmission signal having an inverted phase obtained by inverting the predetermined phase from the selected first antenna, wherein the power receiving device is configured to:

determine a difference signal between:

a first combined signal, which combines the first power transmission signal having the predetermined phase and the first power transmission signal having the fixed power transmission phase, the first power transmission signal having the predetermined phase and the first power transmission signal having the fixed power transmission phase being both received from the plurality of first antennas in the first power transmission process, and a second combined signal, which combines the first power transmission signal having the inverted phase and the first power transmission signal having the fixed power transmission phase, the first power transmission signal having the inverted phase and the first power transmission signal having the fixed power transmission phase being both received from the plurality of first antennas in the second power transmission process, and transmit the difference signal to the power transmission control circuit, and wherein the power transmission control circuit is configured to control phases of power transmission of the plurality of first antennas, based on a plurality of difference signals obtained by selecting each of the plurality of first antennas.

2. The power feeding system according to claim 1, wherein the power transmission control circuit is configured to set the power transmission phase for the non-selected first antenna to a same value in the first transmission process and the second transmission process.

3. The power feeding system according to claim 1, wherein in the second transmission process, the power transmission control circuit is configured to set the power transmission phase for the first antenna that has already been selected in the first transmission process, to the inverted phase.

4. The power feeding system according to claim 1, wherein in the second transmission process, the power transmission control circuit is configured to set the power transmission phase for the first antenna that has already been selected in the first transmission process, to a phase that is obtained based on the difference signal.

5. The power feeding system according to claim 1, wherein in the first transmission process and the second transmission process, the power transmission control circuit is configured to set power transmission phases for one or more second antennas other than the plurality of first antennas, among the plurality of antennas.

6. The power feeding system according to claim 5, wherein the power transmission circuit further includes an antenna selection circuit configured to:

among the plurality of antennas, select, as the plurality of first antennas, multiple antennas having reception strength of a signal transmitted from the power receiving device that is equal to or greater than a predetermined strength, and select, as the one or more second antennas, multiple antennas having the reception strength less than the predetermined strength.

7. The power feeding system according to claim 6, wherein the signal transmitted from the power receiving device is a signal representing the difference signal.

8. The power feeding system according to claim 7, wherein the power transmission control circuit is configured to:

repeatedly perform a frame process including a preparation period for performing the first transmission process and the second transmission process, and a power transmission period for transmitting power from the plurality of first antennas to the power receiving device by controlling phases of a plurality of first power transmission signals transmitted from the plurality of first antennas based on the plurality of difference signals, and use, among the plurality of antennas, the plurality of first antennas that are selected by the antenna selection circuit based on reception strength of the signals representing the difference signals, as the plurality of first antennas for a subsequent frame of a current frame.

9. The power feeding system according to claim 1, wherein the power receiving device is movable.

10. The power feeding system according to claim 1, wherein the power transmission control circuit is configured to control the power transmission phases of the plurality of first power transmission signals transmitted by the plurality of first antennas such that the power reception phases of the plurality of first power transmission signals received by the power receiving device from the plurality of first antennas are aligned based on the plurality of difference signals.

11. A power feeding apparatus for transmitting power transmission signals to a power receiving device, comprising:

an array antenna including a plurality of antennas configured to transmit power; and a power transmission control circuit configured to control phases of the power transmission signals that are to be transmitted from the plurality of antennas to the power receiving device, and control power transmission, wherein the power transmission control circuit is configured to:

select one of a plurality of first antennas included in the plurality of antennas, while transmitting a first power transmission signal having a fixed power transmission phase for a non-selected first antenna among the plurality of first antennas, perform, while selecting the plurality of first antennas one by one, both:

a first power transmission process of transmitting a first power transmission signal having a predetermined phase from the selected first antenna, and a second power transmission process of transmitting a first power transmission signal having an inverted phase obtained by inverting the predetermined phase from the selected first antenna, and control phases of power transmission of the plurality of first antennas, based on a plurality of difference signals obtained by selecting each of the plurality of first antennas, and wherein each of the plurality of difference signals is a difference signal between:

a first combined signal, which combines the first power transmission signal having the predetermined phase and the first power transmission signal having the fixed power transmission phase, the first power transmission signal having the predetermined phase and the first power transmission signal having the fixed power transmission phase being both received by the power receiving device from the plurality of first antennas in the first power transmission process, and a second combined signal, which combines the first power transmission signal having the inverted phase and the first power transmission signal having the fixed power transmission phase, the first power transmission signal having the inverted phase and the first power transmission signal having the fixed power transmission phase being both received by the power receiving device from the plurality of first antennas in the second power transmission process.

12. A power feeding method executed by a power feeding system including a power feeding apparatus, and a power receiving device configured to receive power transmission signals transmitted from the power feeding apparatus, the power feeding apparatus including:

an array antenna including a plurality of antennas configured to transmit power, and a power transmission control circuit configured to control phases of the power transmission signals that are to be transmitted from the plurality of antennas to the power receiving device, and control power transmission, the power feeding method comprising:

by the power transmission control circuit, selecting one of a plurality of first antennas included in the plurality of antennas, while transmitting a first power transmission signal having a fixed power transmission phase for a non-selected first antenna among the plurality of first antennas, performing, while selecting the plurality of first antennas one by one, both:

a first power transmission process of transmitting a first power transmission signal having a predetermined phase from the selected first antenna, and a second power transmission process of transmitting a first power transmission signal having an inverted phase obtained by inverting the predetermined phase from the selected first antenna;

by the power receiving device, determining a difference signal between:

a first combined signal, which combines the first power transmission signal having the predetermined phase and the first power transmission signal having the fixed power transmission phase, the first power transmission signal having the predetermined phase and the first power transmission signal having the fixed power transmission phase being both received from the plurality of first antennas in the first power transmission process, and a second combined signal, which combines the first power transmission signal having the inverted phase and the first power transmission signal having the fixed power transmission phase, the first power transmission signal having the inverted phase and the first power transmission signal having the fixed power transmission phase being both received from the plurality of first antennas in the second power transmission process, and transmitting the difference signal to the power transmission control circuit; and by the power transmission control circuit, controlling phases of power transmission of the plurality of first antennas, based on a plurality of difference signals obtained by selecting each of the plurality of first antennas.

* * * * *